US 8,050,182 B2

(12) United States Patent
Yamamoto et al.

(10) Patent No.: US 8,050,182 B2
(45) Date of Patent: Nov. 1, 2011

(54) NETWORK FAILURE DETECTION SYSTEM, METHOD, AND STORAGE MEDIUM

(75) Inventors: Hiroshi Yamamoto, Kawasaki (JP); Koji Nakamichi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 155 days.

(21) Appl. No.: 12/418,836

(22) Filed: Apr. 6, 2009

(65) Prior Publication Data

US 2009/0323537 A1  Dec. 31, 2009

(30) Foreign Application Priority Data

Jun. 30, 2008  (JP) ................. 2008-171309

(51) Int. Cl.
*H04L 12/26* (2006.01)
(52) U.S. Cl. ............................. 370/242; 370/248
(58) Field of Classification Search .......... 370/216; 709/239, 250, 224, 242
See application file for complete search history.

(56) References Cited

U.S. PATENT DOCUMENTS

| 6,122,664 | A  | * | 9/2000 | Boukobza et al. | ............ | 709/224 |
| 7,738,359 | B1 | * | 6/2010 | Suryaputra et al. | ............ | 370/216 |
| 2004/0078493 | A1 | * | 4/2004 | Blumrich et al. | ............ | 709/250 |
| 2005/0165960 | A1 | * | 7/2005 | Orava et al. | ............ | 709/239 |
| 2006/0190620 | A1 | * | 8/2006 | Kobayashi | ............ | 709/242 |

FOREIGN PATENT DOCUMENTS

JP   A 2006-238052   9/2006

OTHER PUBLICATIONS

Nick Duffield, et al., "Simple Network Performance Tomography," In Proc. of ACM SIGCOMM Internet Measurement Conference 2003, pp. 210 to 215, Oct. 2003.
Qin Lv, et al., "Search and Replication in Unstructured Peer-to-Peer Networks," Proc. of ICS'02, pp. 84 to 95, Jun. 2002.
Eng Keong Lua, et al., "A Survey and Comparison of Peer-To-Peer Overlay Network Schemes," Journal of IEEE Communications Surveys & Tutorials, vol. 7, No. 2, pp. 72 to 93, 2005.
Ion Stoica, et al., "Chord: A Scalable Peer-to-Peer Lookup Protocol for Internet Applications," Journal of IEEE/ ACM Transactions on Networking, vol. 11, No. 1, pp. 17 to 32, Feb. 2003.

* cited by examiner

*Primary Examiner* — Kwang B Yao
*Assistant Examiner* — Syed M Bokhari
(74) *Attorney, Agent, or Firm* — Fujitsu Patent Center

(57) ABSTRACT

A system includes, in order to detect a failure occurring on a transmission path through which service traffic is transmitted from a delivery server, a node that is on the transmission path and that monitors the service traffic, and a monitoring server that determines a location at which a failure has occurred by analyzing information transmitted from the node. Each node measures the service traffic, recognizes an adjacent node, which is a node adjacent in a logic tree structure corresponding to a transmission path, establishes a link, recognizes a position of the node in the logic tree structure, sets a monitoring target link to be monitored in the logic tree structure, uses a measurement result, and transmits the estimation result to one of the adjacent node and the server. The server analyzes the estimation result received from the node, and determines the location of a failure on the transmission path.

4 Claims, 29 Drawing Sheets

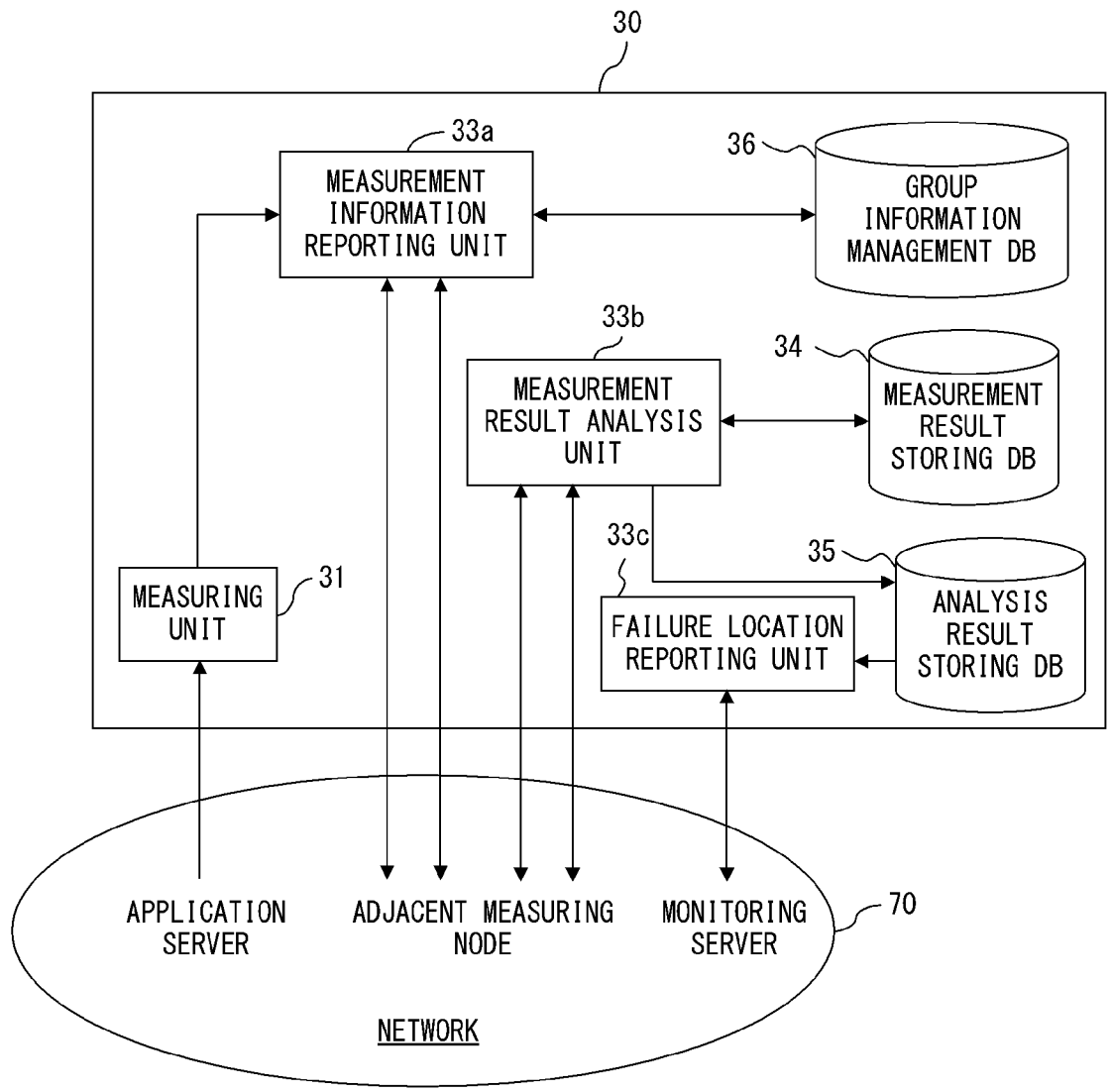
F I G. 5

FIG. 6

| GROUP IDENTIFIER | FUNCTION | UPSTREAM | DOWNSTREAM | MONITORING TARGET SECTION |
|---|---|---|---|---|
| 2 | 0 (MEASUREMENT) | 192.168.10.1 | - | - |
| 4 | 1 (RELAYING) | 192.168.11.3 | 192.168.22.1 | SECTION 1: 192.168.1.1, 192.168.2.1, ..., 192.168.5.1<br>SECTION 2: 192.168.3.1, 192.168.4.2, ..., 192.168.8.1 |
| | | | 192.168.24.2 | |
| 6 | 2 (REPRESENTATIVE) | - | 192.168.32.1 | |
| | | | 192.168.34.2 | |
| ⋮ | ⋮ | ⋮ | ⋮ | ⋮ |

| GROUP IDENTIFIER | RECEPTION QUALITY | SECTION |
|---|---|---|
| 4 | Good | SECTION 1 |
| 4 | Bad | SECTION 2 |
| 11 | Bad | SECTION 1 |
| ⋮ | ⋮ | ⋮ |

F I G. 7

| GROUP IDENTIFIER | MONITORING TARGET SECTION | QUALITY |
|---|---|---|
| 4 | SECTION 1 | Bad |
|  | SECTION 2 | Good |
|  | ⋮ | ⋮ |
| 6 | ⋮ |  |
|  | ⋮ |  |
|  | ⋮ |  |
| ⋮ | ⋮ | ⋮ |

FIG. 8

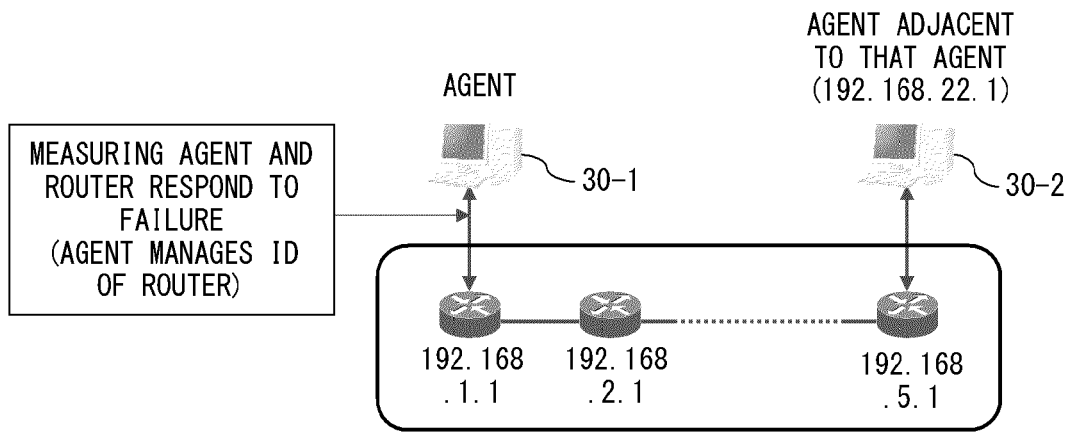
F I G. 9

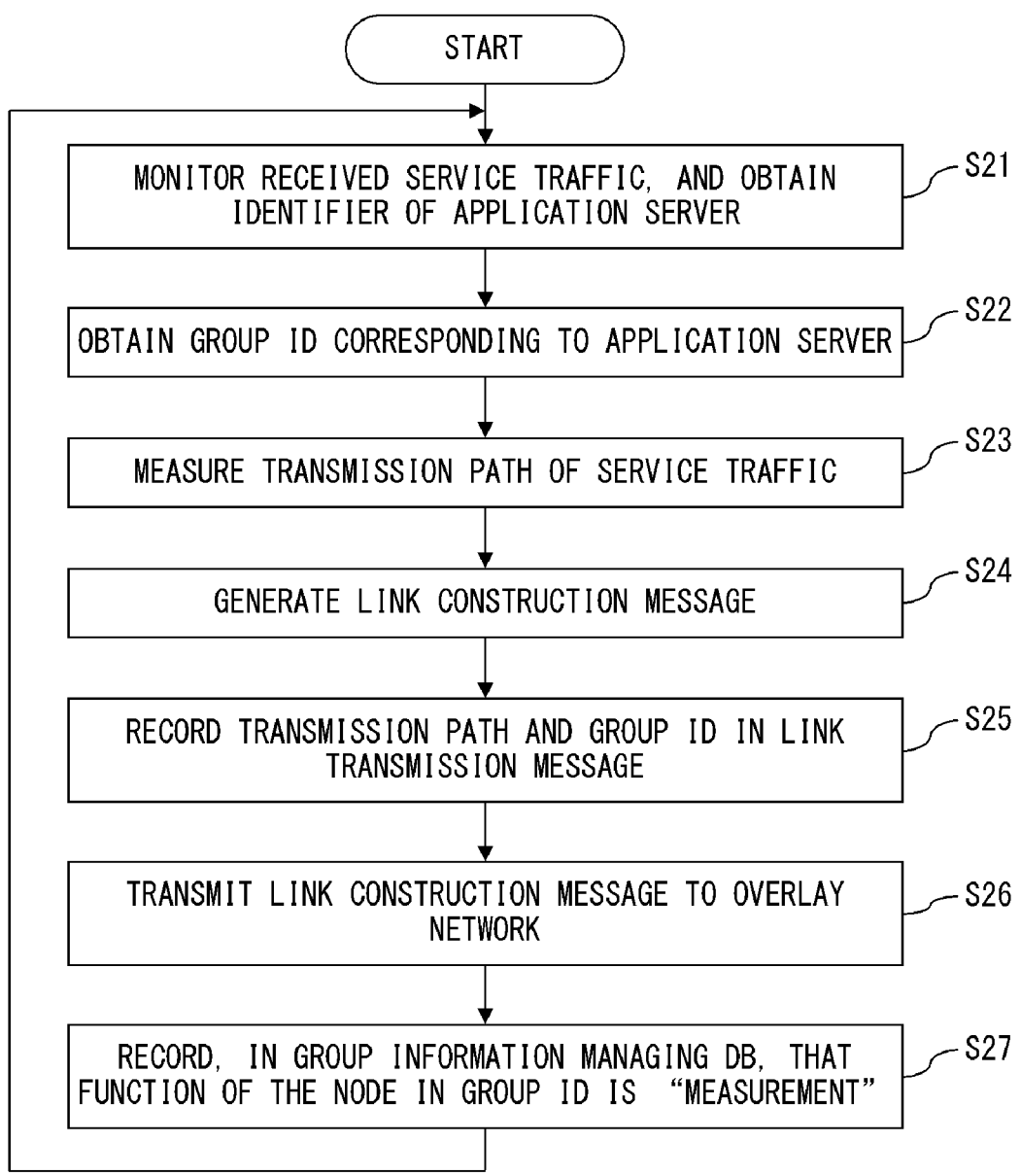
F I G. 1 2

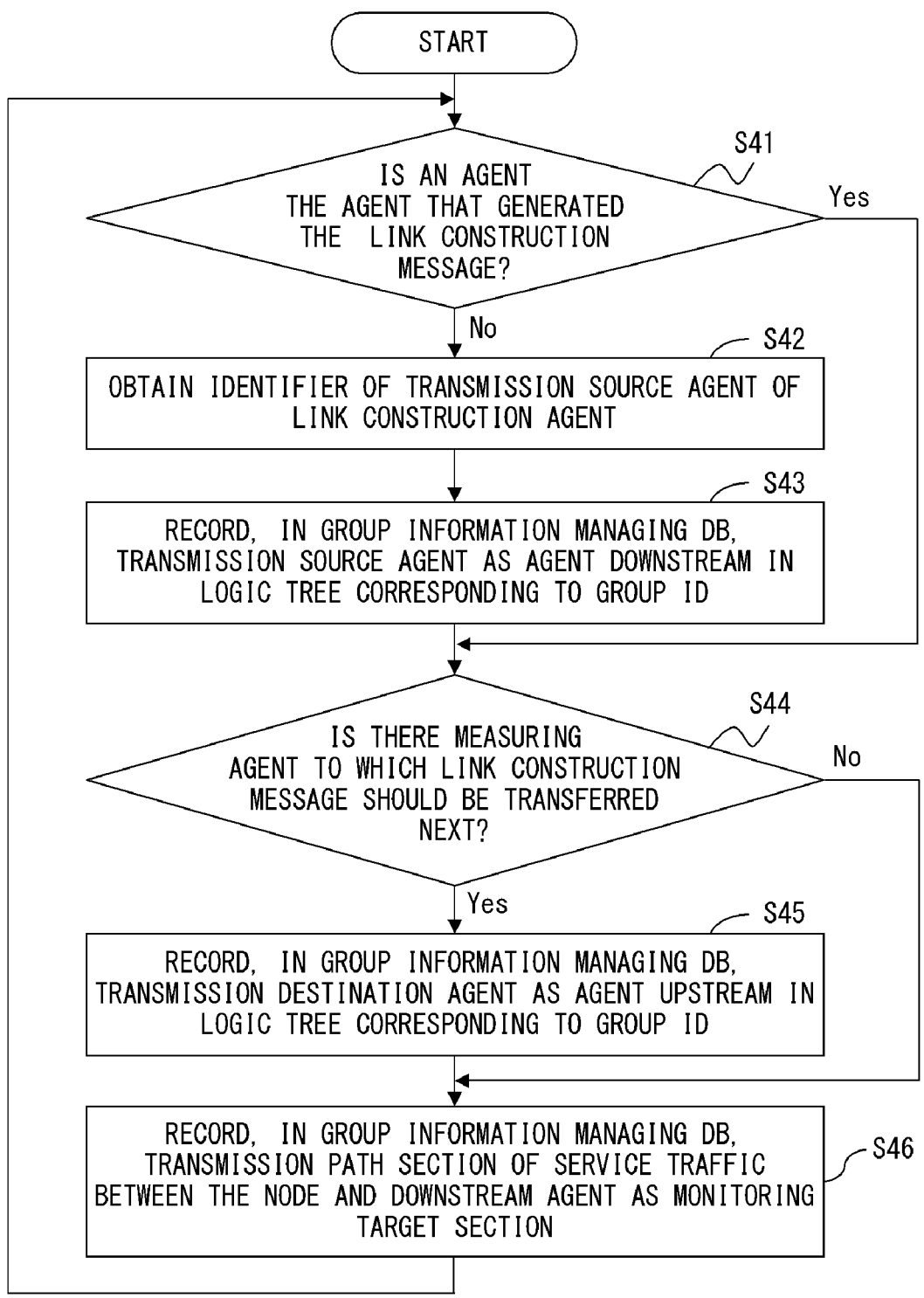
F I G. 14

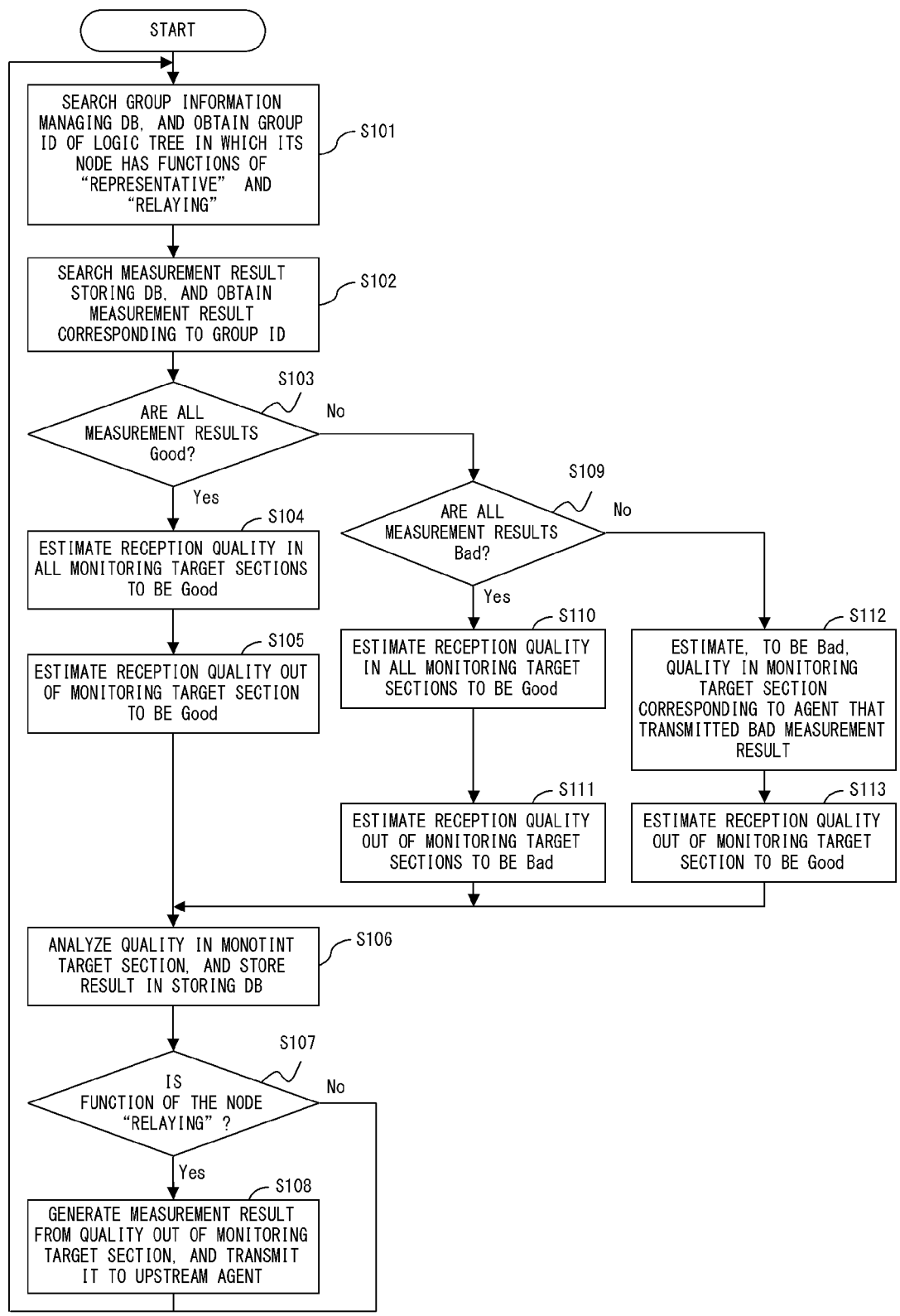
F I G. 19

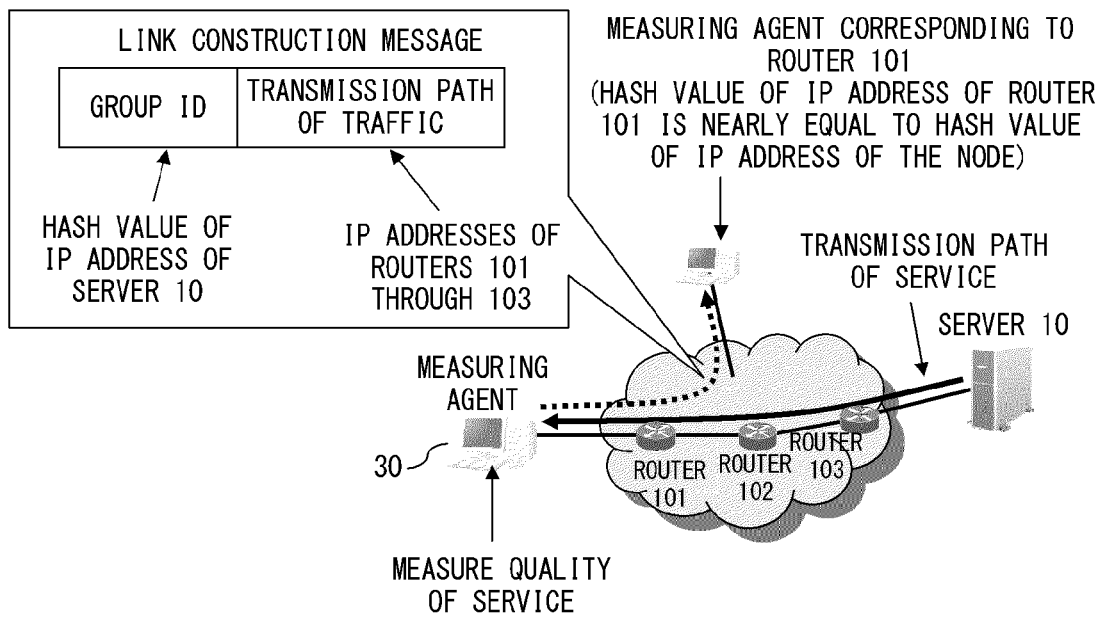
F I G. 2 1

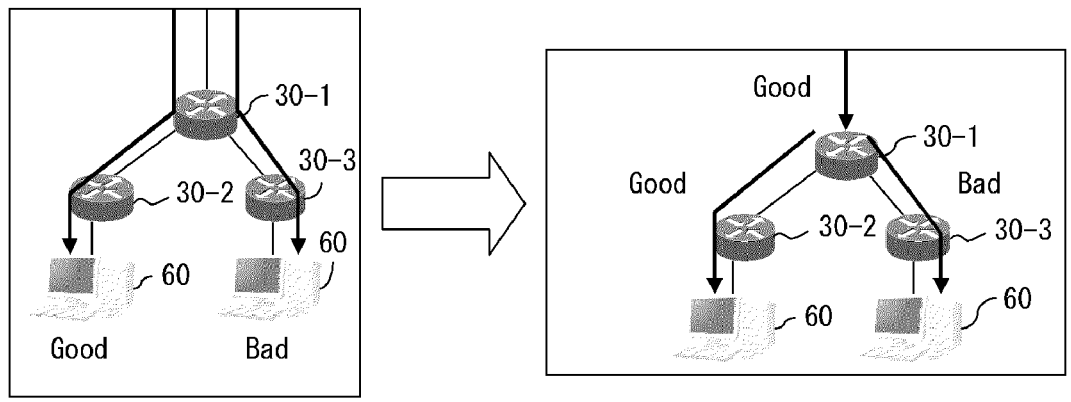
F I G. 2 3

| MONITORING TARGET SECTION |
|---|
| 192.168.1.1, 192.168.2.1, ⋯, 192.168.5.1 |
| 192.168.3.1, 192.168.2.1, ⋯, 192.168.9.1 |
| ⋮ |

FIG. 25

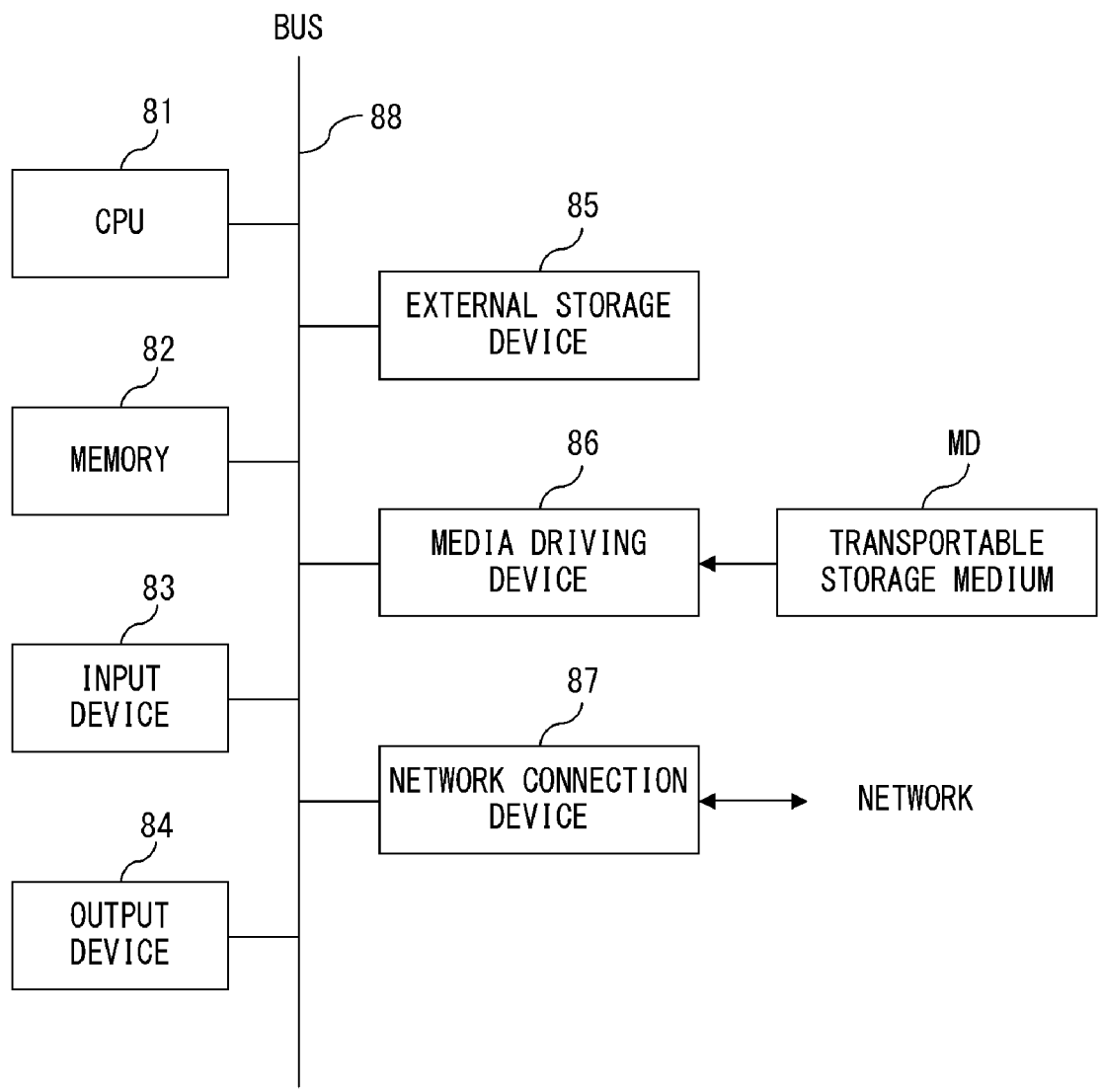
F I G. 29

NETWORK FAILURE DETECTION SYSTEM, METHOD, AND STORAGE MEDIUM

CROSS-REFERENCE TO RELATED APPLICATION

This application is based upon and claims the benefit of priority of the prior Japanese Patent Application No. 2008-171309, filed on Jun. 30, 2008, the entire contents of which are incorporated herein by reference.

FIELD

The embodiments discussed herein are related to a technology of detecting (determining) a failure occurring on a path on a network on which service traffic is transmitted from a delivery server.

BACKGROUND

Networks, the most representative example of which being the Internet, are widely used for providing various types of services. Among such services, there are services for on-line games and the delivery of video images in which service traffic is transmitted continuously for a relatively long time. When a service of this type involves a failure occurring on a transmission path of the service traffic due to a malfunction in a switch or due to congestion in a router, etc., that failure greatly degrades the reception quality of the service traffic. When, for example, a ratio of packet losses increases, a longer time is required for transmitting service traffic. Thus, it is important to rapidly respond to failures occurring on paths (network).

In a conventional technology, the location at which a failure has occurred on a network has been determined on the basis of the personal experience or knowledge of the network manager. However, determination of the location of a failure by a network manager usually takes a long time, and accordingly a technology of automatically determining the location of a failure occurring on a network has been discussed.

FIG. 1 illustrates a method of estimating the location of a failure in a conventional network failure detection system. This system is for automatically detecting a failure occurring on a path of service traffic transmitted from an application server.

The network failure detection system illustrated in FIG. 1 includes a lot of nodes for executing a measuring agent as software, and a monitoring server 280. A node for executing a measuring agent is referred to as a "measuring node" hereinafter in order to distinguish it from a node that does not execute a measuring agent.

In FIG. 1, two measuring nodes denoted by 271 and 272 are illustrated. When a node referred to can be either of the nodes 271 and 272, such a node is referred to as a node 270. This is also applied to two application servers, which are denoted by 261 and 262, and also two nodes (denoted by 291 and 292) other than the measuring node 270. When, for example, an application server referred to can be either of the application servers 261 and 262, such an application server is denoted by 260.

The measuring agent has a function of measuring the transmission path and the reception quality of service traffic transmitted from the application server 260, and of transmitting to the monitoring server 280 a measurement result including the measured reception quality and transmission path. The monitoring server 280 analyzes the measurement result obtained from each of the measuring nodes 270 in order to determine whether or not a failure has occurred. When it is determined that a failure has occurred, the location of the failure is estimated. Thus, the estimation of the location of a failure is executed by a sequence containing an estimation by the measuring node 270 (ST1), a report of the measurement result transmitted to the monitoring server 280 (ST2), and an analysis by the monitoring server 280 (ST3).

An estimation of the location of a failure is performed as follows. Herein, it is assumed that service traffic transmitted from the application server 261 is measured by the measuring node 272, and service traffic transmitted from the application server 262 is measured by the measuring node 271. Specifically, it is assumed that service traffic transmitted from the application server 261 is transferred to the measuring node 272 through a path 1, which includes a link L4 between the application server 261 and the node 291, a link L2 between the nodes 291 and 292, and a link L5 between the node 292 and the measuring node 272, and also that service traffic transmitted from the application server 262 is transferred to the measuring node 271 through a path 2, which includes a link L3 between the application server 262 and the node 292, link L2, and link L1 between the node 291 and the measuring node 271.

A measurement result transmitted from the measuring node 272 to the monitoring server 280 includes a transmission path of service traffic in addition to the reception quality. On the table in FIG. 1, links included in the transmission path are expressed by "1". The expression "deteriorated" means that the measured reception quality is low, i.e., that a failure has occurred in one of the links on the transmission path.

Reception quality is degraded by the congestion of service traffic. Using this relationship, the monitoring server 280 extracts a link that is used by all of the transmission paths that are "deteriorated", and the extracted link is estimated to be the location of a failure. Thereby, in the example illustrated in FIG. 1, link L2 used by both of the paths 1 and 2 is estimated to be the location of a failure.

In the conventional network failure detection system as described above, the monitoring server 280 analyzes the measurement results transmitted from each measuring node 270, and estimates the location of a failure. Due to this configuration, the amount of information to be analyzed by the monitoring server 280 is often enormous, which is problematic. This problem becomes perceptible with the hardware resource requirement becoming higher and the time taken for determining the location of a failure becoming longer due to the greater load.

A method in which a plurality of monitoring servers are provided and information is distributed to them to be processed is proposed in order to eliminate the necessity of managing an enormous amount of information and to allow a rapid determination of the location of a failure. However, when the above distributed processing is employed, the monitoring servers analyze only part of all the information. Accordingly, an analysis covering the entire network is impossible, resulting in a lower accuracy of determining the location of a failure. Monitoring servers have to be provided in a number corresponding to the scale of the network. This means that a lot of monitoring servers have to be provided with a large scale network, making the cost of equipment enormous. Thus, distributed processing using a plurality of monitoring servers is not desirable in view of practical utility.

Reference documents include Japanese Laid-open Patent Publication No. 2006-238052 (Patent Document 1), N. G. Duffield, and et. al., "Simple Network Performance Tomography," In Proc. of ACM SIGCOMM Internet Measurement Conference 2003. (non-Patent Document 1), Q. Lv, et. al., "Search and Replication in Unstructured Peer-to-Peer Networks," Proc. of ICS'02, pp. 84-95, 2002. (non-Patent Document 2), E. Keong, et. al., "A Survey and Comparison of Peer-to-Peer Overlay Network Schemes," Journal of IEEE Communication Surveys, Vol. 7, No. 2, pp. 72-93, 2005. (non-Patent Document 3), and I. Stoica, et. al., "Chord: A Scalable Peer-to-Peer Lookup Protocol for Internet Applications," Journal of IEEE/ACM Transactions on Networking, Vol. 11, No. 1, 2003. (non-Patent Document 4).

SUMMARY

A system which applied the present invention is applied includes, in order to detect a failure occurring on a transmission path through which service traffic is transmitted from a delivery server on a network, a node that is on the transmission path and that monitors the service traffic transmitted from the delivery server, and a monitoring server that determines a location at which a failure has occurred by analyzing information transmitted from the node. Each of the nodes includes: measuring unit that measures the service traffic; adjacent node identifying unit that recognizes an adjacent node, which is adjacent in a logic tree structure corresponding to the transmission path, that establishes a link, that recognizes a position of the node in the logic tree structure, and that sets a monitoring target link, which is a link in which occurrence of the failure is to be monitored in the logic tree structure; failure link estimation unit that uses a measurement result by the measuring unit in order to estimate to be a location of a failure of a monitoring target link in which there is a probability that the failure has occurred among the monitoring target links set by the adjacent node identifying unit, and that transmits the estimation result to one of the adjacent node and the monitoring server. The monitoring server includes: failure link locating unit that analyzes the estimation result received from the node, and that determines (locates) the location of a failure on the transmission path.

Each of the nodes in the above system autonomously constructs a logic tree structure corresponding to a transmission path of the service traffic, sets a monitoring target section, in which occurrence of the failure is to be monitored on the transmission path, monitors a failure occurring in the set monitoring target section; and estimates to be a failure location of a monitoring target link in which there is a probability that the failure has occurred. Such an estimation can narrow a scope (links) that has to be considered for locating a failure occurring in the entire transmission path to a very small scope. However, the location of the failure is performed using the information on the entire transmission path of the service traffic transmitted from the delivery server.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 5 illustrates the functional configuration of a failure location estimation unit;

FIG. 6 illustrates the data structure in a group information managing DB;

FIG. 7 illustrates the data structure in a measurement result storing DB;

FIG. 8 illustrates the data structure in an analysis result storing DB;

FIG. 9 illustrates a monitoring target section in which a node executing a measuring agent monitors failures;

FIG. 12 is a flowchart for implementing a message transmission unit;

FIG. 14 is a flowchart for a process for implementing an adjacent agent determination unit;

FIG. 19 is a flowchart for a process for implementing a measurement result analysis unit;

FIG. 21 illustrates data included in a link construction message;

FIG. 23 illustrates a method of estimating the location of a failure in a node;

FIG. 25 illustrates data structure of a failure estimated location DB;

FIG. 29 illustrates an example of a hardware configuration of a computer that can be used as a measuring node and a monitoring server.

DESCRIPTION OF EMBODIMENTS

Figure 1:
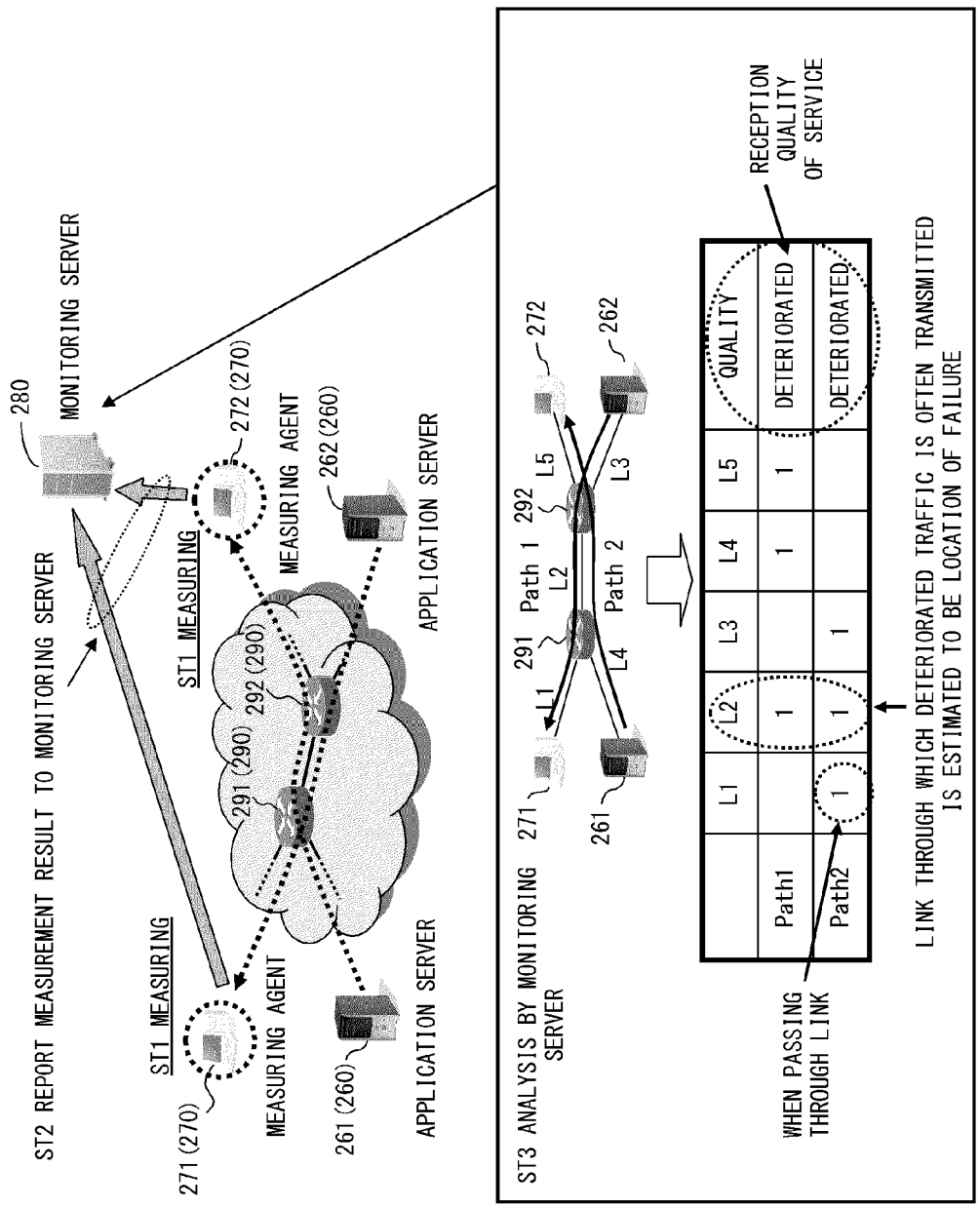
FIG. 1 illustrates a method of estimating the location of a failure in a conventional network failure detection system.

Hereinafter, the embodiments of the present invention will be explained in detail by referring to the drawings.

Figure 2:
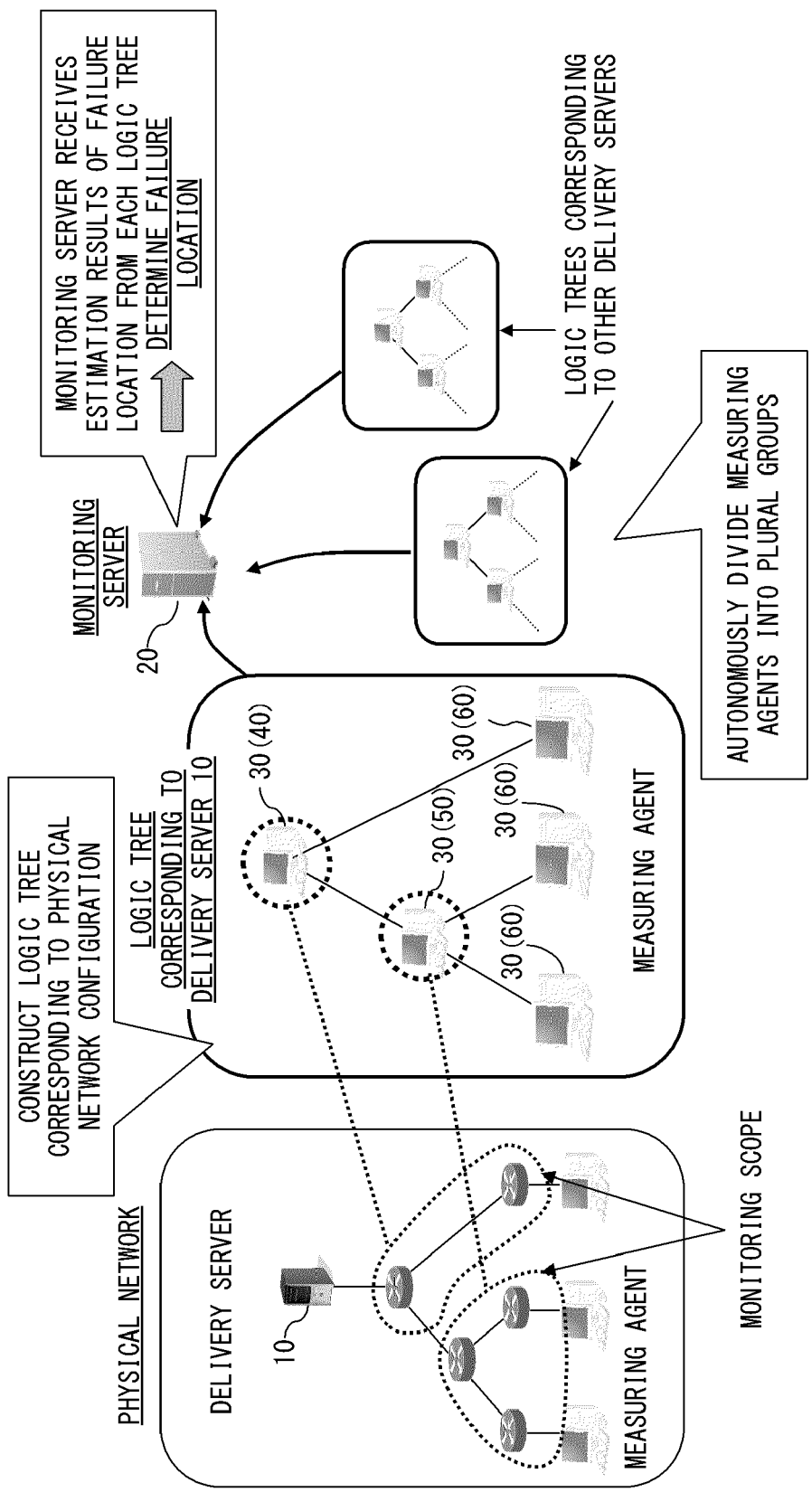
FIG. 2 illustrates the outline of a network failure detection system according to the present invention.

FIG. 2 illustrates the outline of a network failure detection system according to the present embodiment.

The physical network illustrated in FIG. 2 corresponds to a set of transmission paths (a part that exists for every delivery server 10 for transmitting service traffic in the entire network). In the present embodiment, nodes 30 constituting the physical network are made to autonomously construct a logic tree corresponding to the physical network, and each of the nodes 30 executes the processes for the estimation of failures. A monitoring server 20 identifies a failure whose location cannot be determined (can be estimated, but cannot be definitely determined) by each node 30. In this manner, the processes needed to identify a failure are distributed to the individual nodes 30 to be executed by them, and thereby the accuracy of determining (locating) the location of a failure is maintained while the amount of information to be analyzed by the monitoring server 20 is reduced.

The nodes 30 autonomously constructing a logic tree can be used as data processing apparatuses (computers) that are capable of executing a measuring agent as software for distributed processing. In the present embodiment, the overlay network technology is used for constructing a logic tree. The overlay network technology is described below.

The overlay network technology is a technology for constructing networks that include only nodes for a predetermined purpose among nodes (such as routers, computers, gateways, etc.) constituting networks, the most representative example of which is the Internet. On a logical network, logical links are established between nodes in order to attain the purpose of the network, and information is exchanged between the nodes through the logical links. Peer-to-peer (P2P) networks are overlay networks dedicated to the delivery, sharing, and finding of information held by each of the nodes. In a P2P network, a node is provided with information on the nodes adjacent to that node on the logical network and with a rule of transferring data so that all nodes can find the target information. In the present embodiment, the overlay network technology, which utilizes this P2P technology is used.

P2P networks can be classified into two types. One is a P2P network of a non-structured type (non-Patent Document 2) which cannot retrieve target information surely, but can easily be implemented and is appropriate to a fuzzy string search such as a keyword search. The other is a P2P network of a structured type (non-Patent Document 3), which is not easy to implement but can surely retrieve target information. The present embodiment employs a P2P network of a structure type. However, an overlay network having the following characteristics can be employed.

(1) A space of IDs managed by the entire P2P network is given, and each of the nodes has an ID of a predetermined scope. An ID is managed by only one node.
(2) Each of the nodes manages the information corresponding to the management target IDs within the predetermined scope or the index of information.
(3) Messages are exchanged between nodes according to a data transfer rule on a logical network, and thereby a message can be transmitted in a short time to the node that manages a specified ID.

Each of the nodes in a P2P network of a structured type (hereinafter, "P2P network" refers to a P2P network of a structured type unless otherwise stated) basically manages the information described below.
(1) An ID (node ID) for uniquely identifying the node having that ID on a P2P network (Generally, the ID is calculated by inputting the identifier of a node such as the IP address or the port number to a hash function.)
(2) A routing table to be used for transmitting information to plural different nodes in a P2P network (a table representing the correspondence between node IDs and identifiers). Generally, information on log (N) nodes is managed (N is the number of all the nodes on the P2P network).

When, for example, a user makes a request for information corresponding to a certain ID on a P2P network, the node that has received the request generates a search message including the ID, and transmits the search message to the node having the ID closest to that node on the routing table. The node that receives the message transfers the search message to the node having the ID closest to that node. In this manner, the message is repeatedly transferred, and thereby the search message is delivered to the node managing the specified ID (referred to as a corresponding node hereinafter). As a result, when the corresponding node has the information corresponding to the ID, that information is transmitted to the node that received the request. During this process, the search message passes through at most log (N) nodes before being delivered to the corresponding node.

In the present embodiment, a logic tree corresponding to the physical network (transmission path) is autonomously constructed using the above described overlay network technology. Each of the nodes 30 recognizes the target scope (links between adjacent nodes on the logic tree) in which that node has to monitor the occurrences of a failure, and estimates the status of a failure in the target scope, i.e., estimates whether or not a failure has occurred. The estimation of a status of a failure is performed by referring to measurement results obtained from other nodes 30. The measurement result is a message containing measured reception quality and the transmission path.

The nodes 30 autonomously constructing the logic tree are nodes that execute a measuring agent as software for realizing a network failure detection system in the present embodiment. A node for executing a measuring agent is referred to as a "measuring node" hereinafter in order to distinguish it from a node that does not execute a measuring agent. Because the measuring nodes 30 are controlled by a measuring agent, a "measuring agent" is used herein to mean the measuring node 30.

Figure 3:
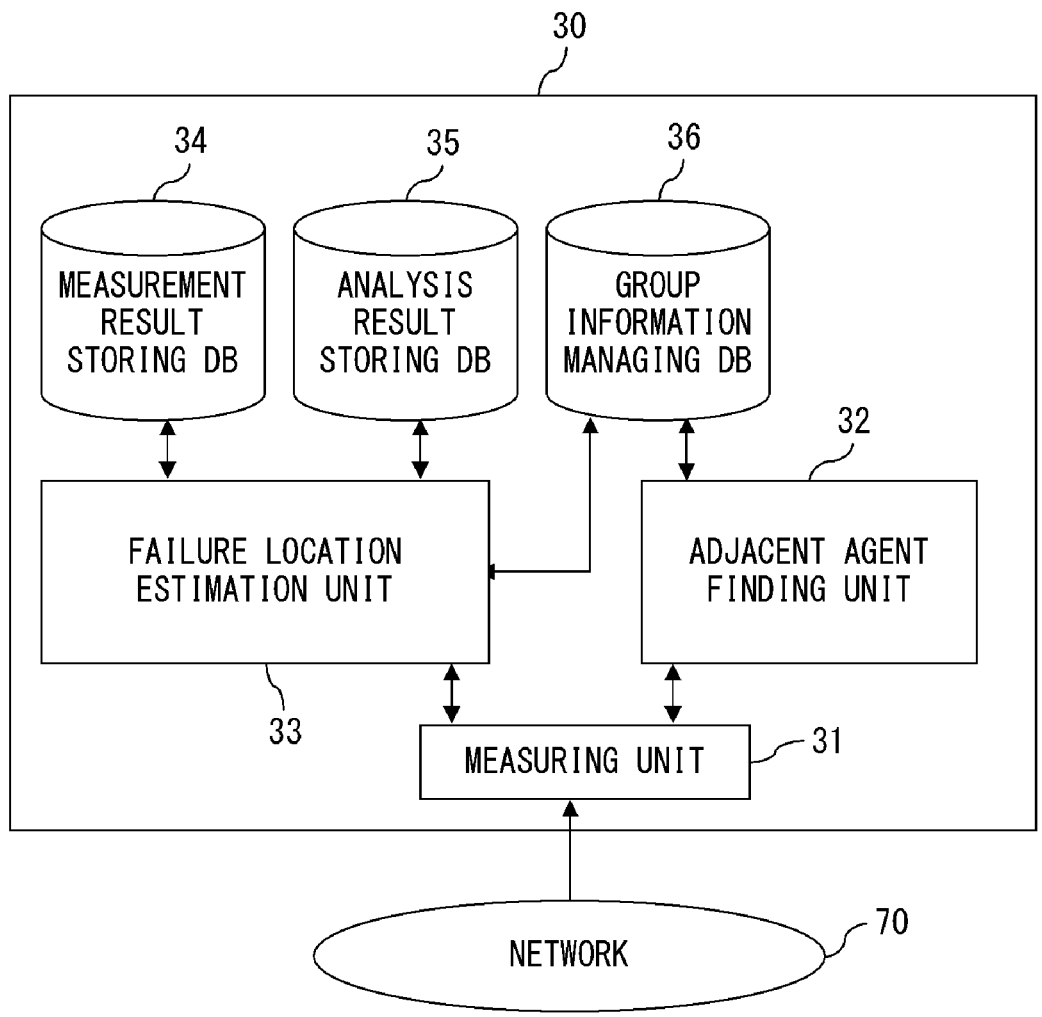
FIG. 3 illustrates the functional configuration of a node that executes a measuring agent.

FIG. 3 illustrates the functional configuration implemented by a measuring agent in each of the measuring nodes 30. As illustrated in FIG. 3, the measuring agent implements, in the node 30, a measuring unit 31 for measuring service traffic transmitted from a delivery server 10, an adjacent agent finding unit 32 for autonomously constructing a logic tree and finding an adjacent node on the logic tree, and a failure location estimation unit 33 for monitoring the status of a failure in the monitoring scope determined by the adjacent agent finding unit 32. The measuring agent generates and manages a measurement result storing database (DB) 34, an analysis result storing DB 35, and the group information managing DB 36. The measuring agent is stored in a storage device that is provided to the node 30 or can be accessed by the measuring node 30. It is also possible to transmit the information through a network 70 as necessary.

FIG. 29 illustrates an example of a hardware configuration of a computer that can be used as the above measuring node 30. Before a detailed explanation of respective units 31 through 33 in FIG. 3 is given, a specific explanation will be given for the configuration of a computer that can be used as the measuring node 30.

The computer illustrated in FIG. 29 includes a CPU 81, memory 82, an input device 83, an output device 84, an external storage device 85, a media driving device 86, and a network connection device 87, all of which are connected to each other via a bus 88. The configuration illustrated in FIG. 29 is only an example, and is not intended to limit the scope of the present invention.

The CPU 81 controls the entire computer. The memory 82 is a memory device such a RAM or the like for temporarily storing programs or data stored in the external storage device 85 (or a transportable storage medium MD) when such programs and data are to be executed or updated. The CPU 81 reads such programs onto the memory 82 and executes them in order to control the entire computer.

The input device 83 is a device such as an interface connected to other devices to be operated by the user (such as a keyboard or a mouse), or is a device including all of them. The input device 83 detects the operations on such operation targets, and transmits the detection results to the CPU 81.

The output device 84 is a display control device connected to, for example, a display device, or a device including a display control device and a display device. The output device 84 outputs data transmitted under control of the CPU 81 to a display device.

The network connection device 87 communicates with the other measuring nodes 30 as external devices, the delivery server 10, and the monitoring server 20 through the network 70. The external storage device 85 is, for example, a hard disk device. The external storage device 85 is used mainly for storing data and programs.

The media driving device 86 accesses a transportable storage medium MD such as an optical disk, a magneto-optical disk, or the like.

In the configuration illustrated in FIG. 29, the measuring agent is stored in the external storage device 85 or the storage medium MD, or is received from an external device through the network 70 by using the network connection device 87. The DBs 34 through 36 in FIG. 3 are constructed in, for example, the external storage device 85. The measuring agent read from the external storage device 85 or the storage medium MD, or received by the network connection device 87, is stored in the memory 82, and is executed by the CPU 81. The execution of the measuring agent makes a computer of the configuration in FIG. 29 function as the measuring node 30.

Figure 4:
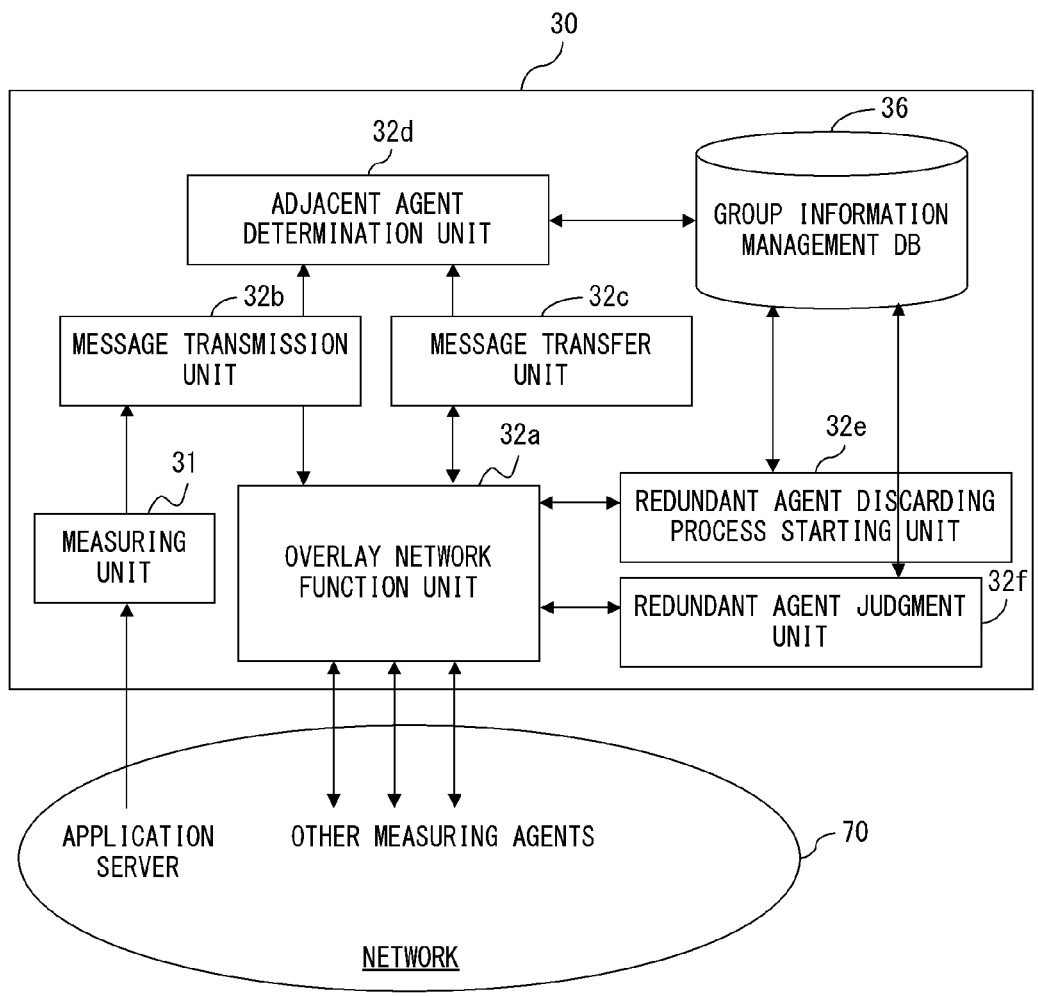
FIG. 4 illustrates the functional configuration of an adjacent agent finding unit.

FIG. 4 illustrates the functional configuration of the adjacent agent finding unit 32. As illustrated in FIG. 4, the adjacent agent finding unit 32 includes an overlay network function unit 32a, a message transmission unit 32b, a message transfer unit 32c, an adjacent agent determination unit 32d, a redundant agent discarding process starting unit 32e, and a redundant agent judgment unit 32f. In FIG. 4, the delivery server 10 is described as an "application server". This is applied also to FIG. 5.

FIG. 5 illustrates the functional configuration of the failure location estimation unit 33. As illustrated in FIG. 5, the failure location estimation unit 33 includes a measurement information reporting unit 33a, a measurement result analysis unit 33b, and a failure location reporting unit 33c.

The measuring agent implementing the adjacent agent finding unit 32 and the failure location estimation unit 33 makes the measuring nodes 30 execute the processes as described below. Hereinbelow, detailed explanations will be given for the operations of the adjacent agent finding unit 32 and the failure location estimation unit 33 by referring to the flowcharts in FIGS. 10 through 20.

Figure 10:
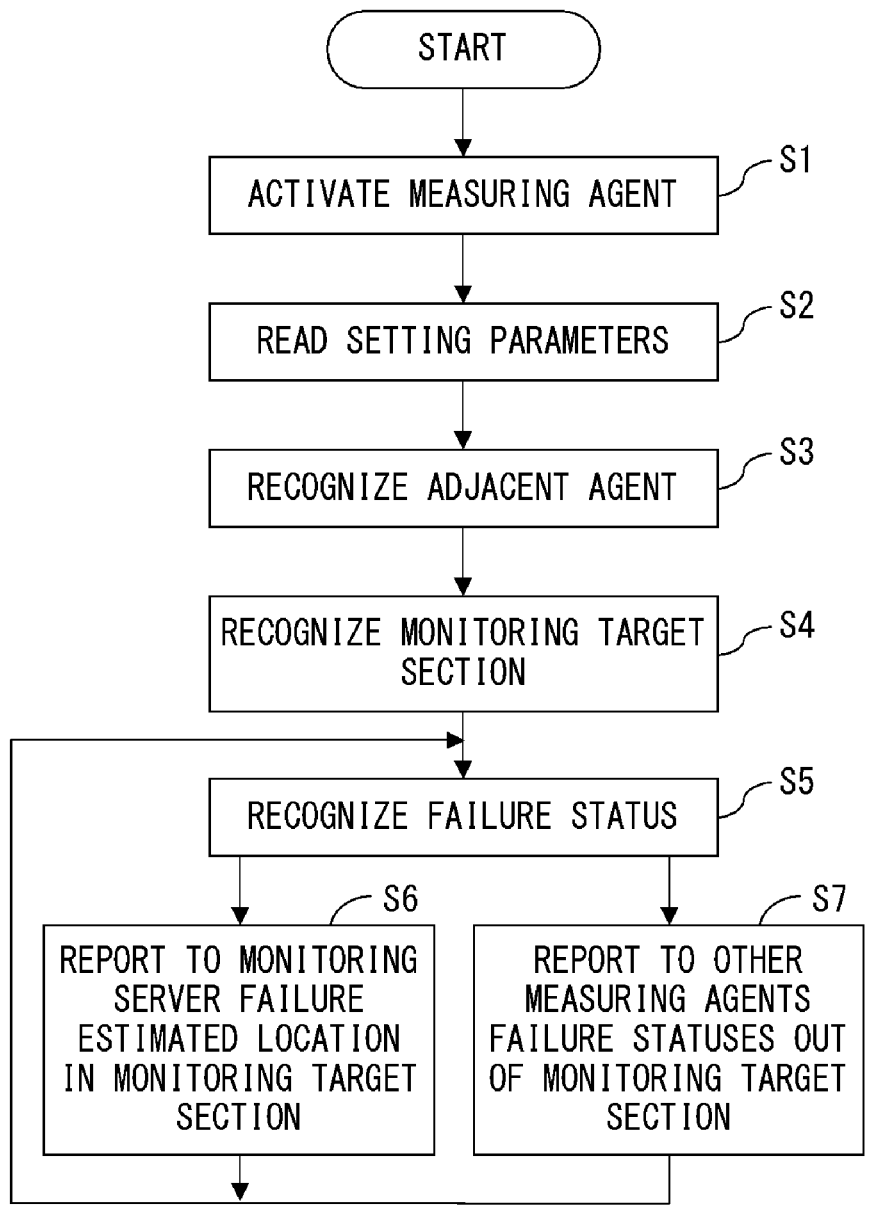
FIG. 10 is a flowchart illustrating the outline of a process executed by a measuring agent.

FIG. 10 is a flowchart illustrating the outline of the process executed by the measuring agent. First, the outline of the process will be explained by referring to FIG. 10.

The measuring node 30 is an entity such as a router or the like in the network 70, or is a computer (a personal computer (PC), a PDA, or a home electric appliance (such as a set-top box)) used by users who utilize the services by the delivery server 10. The measuring node 30 is on the bottom layer on the logic tree, and is a final transfer destination of service traffic transmitted from the delivery server 10 on the network 70. The flowchart in FIG. 10 is for a case where the computer used by a user is the measuring node 30.

The measuring agent is activated (step S1) in association with the activation of an application for allowing users to use a computer to receive services from the delivery server 10 (Hereinafter, this application is referred to as "service receiving application". Examples of this application include an application for receiving (replaying) images, an application for telephone, etc. This measuring agent may be resident on memory in a computer for users. When the measuring node 30 is in the form of hardware such as a home gateway, etc., or when the measuring node 30 is a router, the measuring node 30 may be activated in association with the turning on of power.

After being activated, the measuring agent reads various setting parameters such as "interval of calculating measurement results", "interval of analyzing calculation results", "interval of reporting analysis results", "threshold value of reception quality", and "identifier of monitoring server 20" in accordance with, for example, instructions from a user (step S2). Values of these parameters are periods such as 10 (seconds) if they are time-related parameters such as "interval of calculating measurement results", "interval of analyzing measurement results", or "interval of reporting analysis results". Values for the parameters such as "threshold value of reception quality" are, for example, information made up of a set of index for evaluating reception quality and the threshold in the index such as "1 percent as packet loss ratio". Thereby, when "1 percent as packet loss ratio" is set in the corresponding information, a packet loss ratio higher than 1 percent results in "bad" reception quality and a packet loss ratio not higher than 1 percent results in "good" reception quality. This index can be applied to wide aspects representing reception quality such as inconsistencies in the intervals of the arrival of packets.

"Identifier of monitoring server" is, for example, the IP address of a server. Any value, such as a URL by which the measuring node 30 can uniquely identify the monitoring server, can be used as the identifier. Identifiers may be reported by the monitoring server 20 or may be reported by other measuring nodes 30.

The above parameters may be read from a file. In the measuring node 30 such as routers or the like, files storing such parameters may be prepared to be read after the activation.

After the parameters are read, procedures for finding the adjacent node 30 are followed in order to participate in an overlay network and establish a logical link (step S3). Upon the participation in an overlay network, when, for example, a overlay network "Chord" (non-Patent Document 4) is assumed, the ID by which the node can uniquely be identified on the network 70 is first calculated, and thereafter a virtual link with the measuring nodes 30 that have already been on the overlay network is established. Next, the measuring node 30 exchanges search messages with the measuring nodes 30 with which links have been established, and recognizes the identifier of the adjacent measuring node 30 so that a logic tree entirely corresponding to the path is constructed through which service traffic is transmitted from the delivery (application) server 10 to the measuring nodes 30. For the autonomous construction of a logic tree, an overlay network having the characteristics described below is desirably used.

< > Each of the measuring nodes 30 manages IDs in a prescribed scope (in other words, each ID is managed by only one measuring node 30).

< > Each of the messages is transmitted through a plurality of measuring nodes 30 so that they can be surely delivered to the measuring nodes 30 managing any IDs.

After the procedures for finding the adjacent node 30 are followed, the monitoring target section is recognized by comparing the transmission path of service traffic and the structure of the logic tree (step S4). The adjacent agent finding unit 32, whose configuration is illustrated in FIG. 4, is implemented by the execution of steps S3 and S4. The failure location estimation unit 33, whose configuration is illustrated in FIG. 5, is implemented by the execution of steps S5 through S7, which will be explained later.

In step S5, the status of a failure in the monitoring target section is recognized in accordance with the parameters. For example, when the "interval of calculating measurement results" is 10 seconds, the reception results of service traffic are compared with "threshold of reception quality" and the reception quality is determined every 10 seconds. If "threshold of reception quality" specifies 1 percent as the packet loss ratio and the actual packet loss ratio is 1.5 percent, it is determined that the reception quality is bad. The reception quality thus determined is stored in the measurement result storing DB 34 as a measurement result. If the "interval of analyzing measurement results" is 10 seconds, the measurement results are read out and the status of a failure in and out of the monitoring target section is estimated every 10 seconds. The measurement result of a point out of the monitoring target section is transmitted to the upstream adjacent node 30 on the logic tree, and the measurement result in the monitoring target section is stored in the analysis result storing DB 35.

Next, FIGS. 7 and 8 are referred to in order to specifically explain the structure of data in the measurement result storing DB 34 and the analysis result storing DB 35. FIG. 7 illustrates the structure of data in the measurement result storing DB 34, and FIG. 8 illustrates the structure of data in the analysis result storing DB 35.

In the measurement result storing DB 34, as illustrated in FIG. 7, each record includes a group identifier (ID) reception quality, and plurality of pieces of data in the section. In the analysis result storing DB 35, as illustrated in FIG. 8, each of the records includes a monitoring target section and reception quality for each group identifier (ID).

A logic tree is constructed for each of the delivery servers 10 or for each of the services provided by the delivery servers 10. This is because many users receive services from different delivery servers in the system, i.e., different transmission paths are used for each of the delivery servers 10 or for each of the services provided by the delivery servers 10. A group identifier uniquely represents a logic tree constructed for each of the delivery servers 10 or for each of the services provided by the delivery servers 10. Hereinafter, explanations will be given on the assumption that a logic tree is constructed for each of the delivery servers 10 for simplicity. According to this assumption, a group identifier is, for example, a hash value calculated from the IP address of the delivery server 10.

FIG. 10 is again explained.

In step S6, the information in the analysis result storing DB 35 is read out and whether or not a failure has occurred in the monitoring target section is determined (estimated) each time the time specified by the "interval of reporting analysis results" elapses. When it is determined that a failure has occurred, information on the monitoring target section in which the occurrence of the failure has been determined is reported to the monitoring server 20. In step S7, the information (measurement result) in the measurement result storing DB 34 is read out each time the time specified by the "interval of reporting analysis results" elapses, and the read information is transmitted to the adjacent node 30. Reports are transmitted to the monitoring server 20 on an as-necessary basis, and when the transmission to the adjacent node 30 is completed, the process returns to step S5. Thereby, a state in which the occurrence of a failure can be responded to is maintained.

Figure 11:
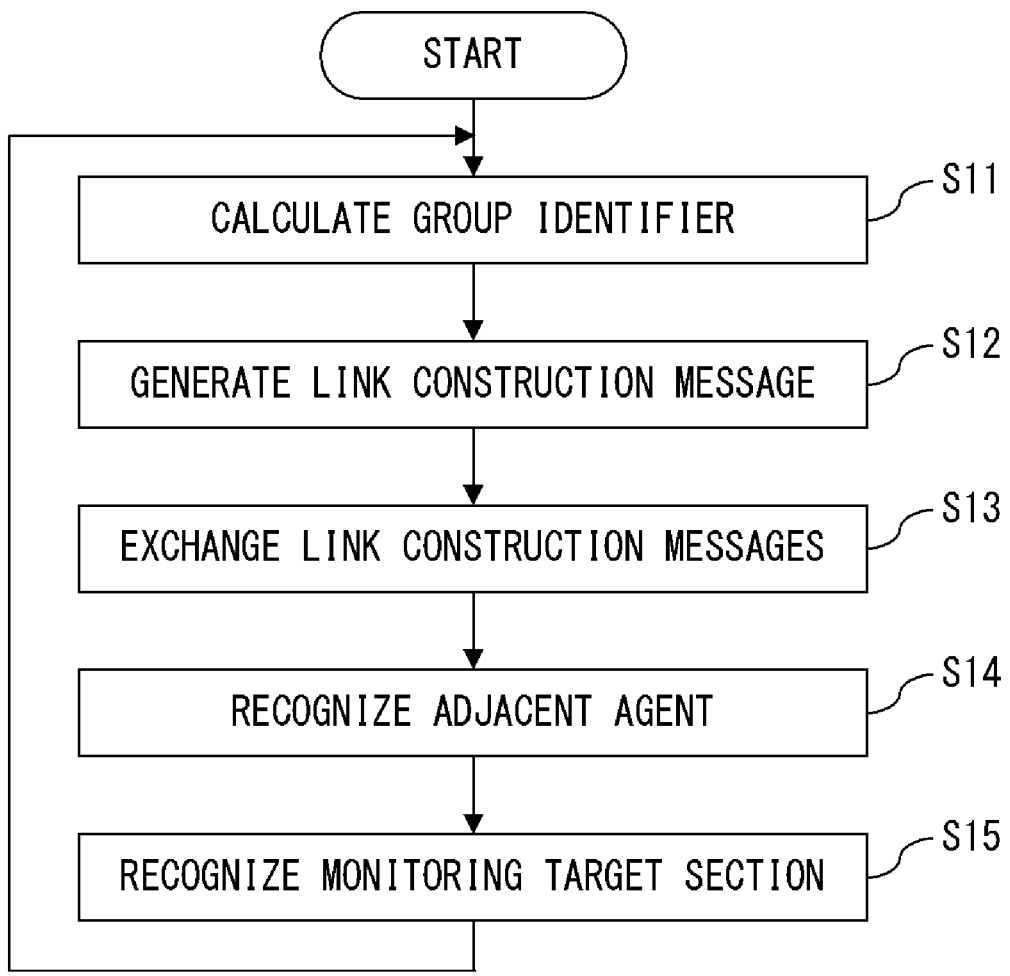
FIG. 11 is a flowchart for illustrating in detail the processes executed in steps S3 and S4 in FIG. 10.

FIG. 11 is a flowchart for illustrating in detail the processes executed in steps S3 and S4. The adjacent agent finding unit 32 is implemented by the execution of the processes illustrated in FIG. 11. Next, the processes for implementing the adjacent agent finding unit 32 will be explained more specifically by referring to FIG. 11.

First, in step S11, the service traffic received from the delivery server 10 is monitored and the group identifier is calculated from the identifier of that server 10. A group identifier is a value by which the delivery server 10 can be uniquely identified, such as the hash value calculated using the IP address (and the port number) of the delivery server 10.

In step S12, a link construction message, as illustrated in FIG. 21, containing the group identifier obtained in step S11 and the information on the transmission path of the service traffic from the application server to the node 30 is generated in order to find the node 30 adjacent to that node 30 on the logic tree corresponding to the transmission path of the service traffic.

In step S13, the generated link construction message is exchanged between a plurality of measuring nodes 30 through the overlay network in which the node 30 is participating. In step S14, the measuring node 30 that is adjacent to the node 30 on the logic tree corresponding to the transmission path of the service traffic is recognized on the basis of the exchange of the message, and a logical link is established with that adjacent node. This establishment of the link makes it possible to locate the positions of the node 30 and the adjacent node 30 on the logic tree; that is, the logic tree is constructed. Thereafter, the process proceeds to step S15.

In step S15, the monitoring target section on the transmission path of the service traffic is recognized on the basis of the positions of the node 30 and the adjacent node 30 in the constructed logic tree. Thereafter, the process returns to step S11. Thereby, the process prepares for the construction of a new logic tree.

FIGS. 12 through 16 are flowcharts for the processes for implementing the units 32b through 32f in the adjacent agent finding unit 32. Next, the processes for implementing the units 32b through 32f will be explained in detail by referring to the flowcharts in FIGS. 12 through 16.

The overlay network function unit 32a illustrated in FIG. 4 realizes the construction of a logic tree of (an overlay network) and communications with other measuring nodes 30 that constitute the overlay network. The overlay network function unit 32a operates in association with other constituent elements. Thus, the adjacent agent finding unit 32 is not included in a group of the units to be explained with reference to the flowcharts.

FIG. 12 is a flowchart for implementing the message transmission unit 32b. First, FIG. 12 is referred to in order to explain the process for implementing the message transmission unit 32b. That process is executed in the above steps S12 and S13.

First, in step S21, the service traffic that the node 30 receives is monitored, and the identifier of the delivery (application) server 10 that transmits the monitored service traffic is obtained. In step S22, based on the obtained identifier of the delivery server 10, the group identifier of the delivery server 10 is calculated. Thereafter, the process proceeds to step S23.

In step S23, the transmission path (identifiers of the routers and the like that relay the service traffic) of the service traffic between the delivery server 10 and the node 30 is obtained. Any methods of obtaining the path may be used as long as the method permits the obtainment of the identifier of the relaying routers, although Traceroute, which searches for identifiers of relaying routers by transmitting a measuring packet from the measuring nodes 30, is a representative method.

In step S24, a link construction message is generated. In step S25, the obtained group identifier and the obtained transmission path of the service traffic are recorded in the generated link message. When this information is recorded, the link construction message is completed (FIG. 21).

In step S26, the link construction message is transmitted toward the measuring node 30 adjacent (an upstream stage) to the node 30 on the obtained transmission path of the service traffic in accordance with the message transfer protocol in the overlay network containing the node 30. In step S27, the function of the node 30 on the logic tree corresponding to the group identifier obtained in step S22 is set to "measurement", and this is recorded in the group information managing DB 36. Thereafter, the process returns to step S21.

The measuring unit 31 measures the index representing the reception quality by monitoring the service traffic. Thus, the process for implementing the measuring unit 31 is executed separately from the processes in FIG. 10. However, since this process is executed by a known measuring technique, a detailed explanation of this process is omitted. The measurement result obtained by this process is referred to by the failure location estimation unit 33 each time the period specified by the "interval of calculating measurement result" elapses.

FIG. 6 illustrates the data structure of the group information managing DB 36. As illustrated in FIG. 6, this group information managing DB 36 manages the function of the node 30, the measuring node 30 adjacent to that node 30 on the transmission path of the service traffic, and the group information including the monitoring target section for each of the logic trees (group identifiers). As the adjacent node 30, the nodes in the upstream stage (on the side of the delivery server 10) and in the downstream stage on the transmission path are registered. The monitoring target section is the link established between the node 30 and another one of the nodes 30 that is adjacent to that node 30 on the downstream stage. As illustrated in FIG. 9, this monitoring target section is illustrated by the IP addresses of the nodes existing between the node 30 and the node 30 adjacent to that node 30 in that order.

The function "measurement" is a function that the measuring nodes 30 on the bottom layer in the constructed logic tree are required to have. The measuring nodes 30 on the bottom layer of the logic tree are the transmission destinations of service traffic. Accordingly, the measured reception quality directly represents whether or not a failure has occurred. It is not necessary to estimate the location of a failure or to transfer the measurement result transmitted from other measuring nodes 30. Therefore, the function "measurement" is assigned to the measuring nodes 30 on the bottom layer on the logic tree, which means that they do not have to perform other functions. The monitoring target section is not registered. In FIG. 2, the measuring nodes 30 to which the function "measurement" is assigned are illustrated with the additional symbols "(60)".

Between the measuring node 30 with the additional symbol "(40)" and the application server, there is no measuring node 30 corresponding to the routers. This type of the measuring node 30 is assigned the function "representation". The nodes 30 that are assigned neither "representation" nor "measurement" are assigned "relaying". Such nodes 30 are illustrated with the additional symbol "(50)". Because the positions of the measuring nodes 30 are different between the different logic trees, it sometimes occurs that the functions "representation", "relaying" and "measurement" are all assigned to one of the measuring nodes 30.

The measuring node 30 assigned the function of relaying relays the measurement result transmitted from the downstream measuring node 30. In addition, the measuring node 30 assigned the function of representation executes a process of removing measuring nodes 30 that are unnecessary for the construction of a logic tree (redundant nodes). The operation of each of the functions will be explained in detail later. Hereinafter, the measuring nodes 30 whose functions are obvious are denoted by the symbols corresponding to the functions. Specifically, symbols "40", "50" and "60" represent "representative", "relaying", and "measurement", respectively.

Figure 13:
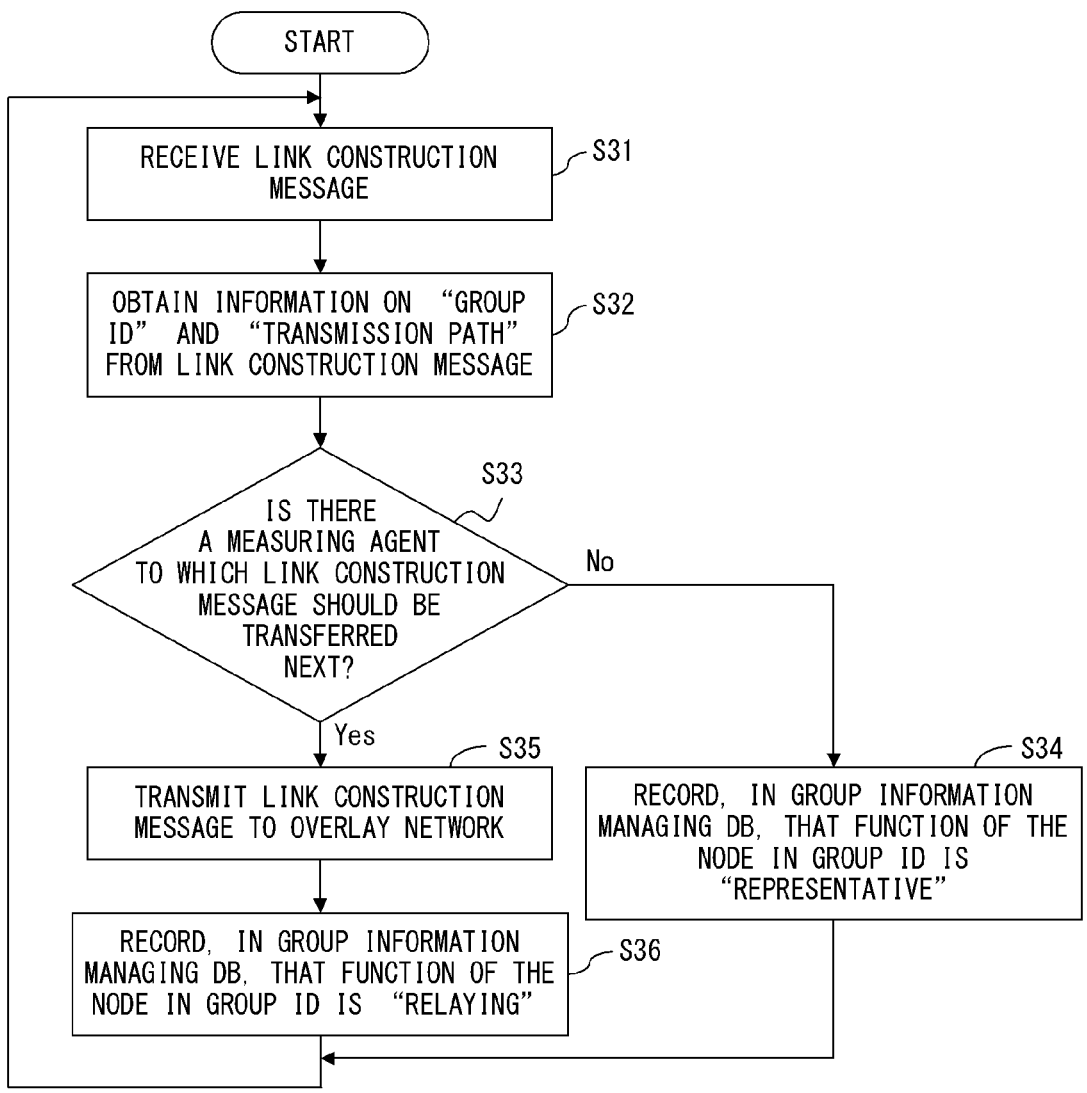
FIG. 13 is a flowchart for a process for implementing a message transfer unit.

FIG. 13 is a flowchart for a process for implementing the message transfer unit 32c. Next, the process for implementing the message transfer unit 32c will be explained in detail by referring to FIG. 13. This process is executed in step S13 in FIG. 11, being activated by, for example, the reception of a link construction message.

First, in step S31, a link construction message transmitted from one of the other measuring nodes 30 in the overlay network is obtained. In step S32, information on the transmission path of the service traffic and the group identifier recorded in the link construction message are obtained. In step S33, information on the transmission path of the service traffic is referred to, and the position of the node 30 is confirmed on the transmission path, and whether or not the measuring node 30 to which the link construction message should be transferred exists is confirmed. When there is no measuring node 30 to which the message should be transferred, i.e., when the delivery server 10 is in an upstream stage on the logic tree, the determination result is "No", and the process proceeds to step S34. Otherwise, the determination result is "Yes" and the process proceeds to step S35.

In step S34, it is determined that the function of the node 30 on the logic tree corresponding to the obtained group identifier is "representation", and the content of the group information managing DB 36 is updated. Thereafter, the process returns to step S31 above.

In step S35, the link construction message is transmitted to the measuring node 30 that should receive that message. The transmission path of the link construction massage is updated so that it includes the network devices existing between the node 30 that is going to transmit the message and the delivery server 10. In step S36, the content of the group information managing DB 36 is updated so that it specifies the function of the node 30 on the logic tree to be "relaying". Thereafter, the process returns to step S31.

Service traffic is transmitted from the upstream side to the downstream side, and link construction messages, by contrast, are transmitted from the downstream side to the upstream side. Thereby, the node 30, having the adjacent node 30 on at least one of the upstream and downstream sides, can recognize that adjacent node 30 and a transmission path including that adjacent node 30. This makes it possible to set the function of the node 30 appropriately.

FIG. 14 is a flowchart for a process for implementing the adjacent agent determination unit 32d. The process for implementing the adjacent agent determination unit 32d will be explained by referring to FIG. 14. This process is executed as the processes in steps S14 and S15.

First, in step S41, it is determined whether or not the node 30 has generated a link construction message. When a link construction message has not been generated, the determination result is No, and the process proceeds to step S42. Otherwise, the determination result is Yes, and the process proceeds to step S44.

In step S42, the group identifier recorded in the link construction message transmitted from one of the other measuring nodes 30 is obtained. In step S43, the identifier of the measuring node 30 that transmitted the link construction message is recorded in the group information managing DB 36. Thereafter, the process proceeds to step S44.

In step S44, it is determined whether or not there is a measuring node 30 to which the link construction message should be transferred next. When there is such a measuring node 30, the determination result is Yes, and the process proceeds to step S45. Otherwise, the determination result is No, and the process proceeds to step S46.

In step S45, the adjacent node 30 as the transmission destination that is closer to the delivery server 10 than the node 30 on the transmission path of the service traffic corresponding to the group identifier recorded in the link construction message is considered the adjacent node 30 on the upstream stage on the logic tree, and the identifier of that adjacent node is recorded in the group information managing DB 36. In step S46, the path between that node 30 and the network device corresponding to the downstream adjacent node 30 is recorded in the group information managing DB 36 as the monitoring target section. Thereafter, the process returns to step S41.

Figure 15:
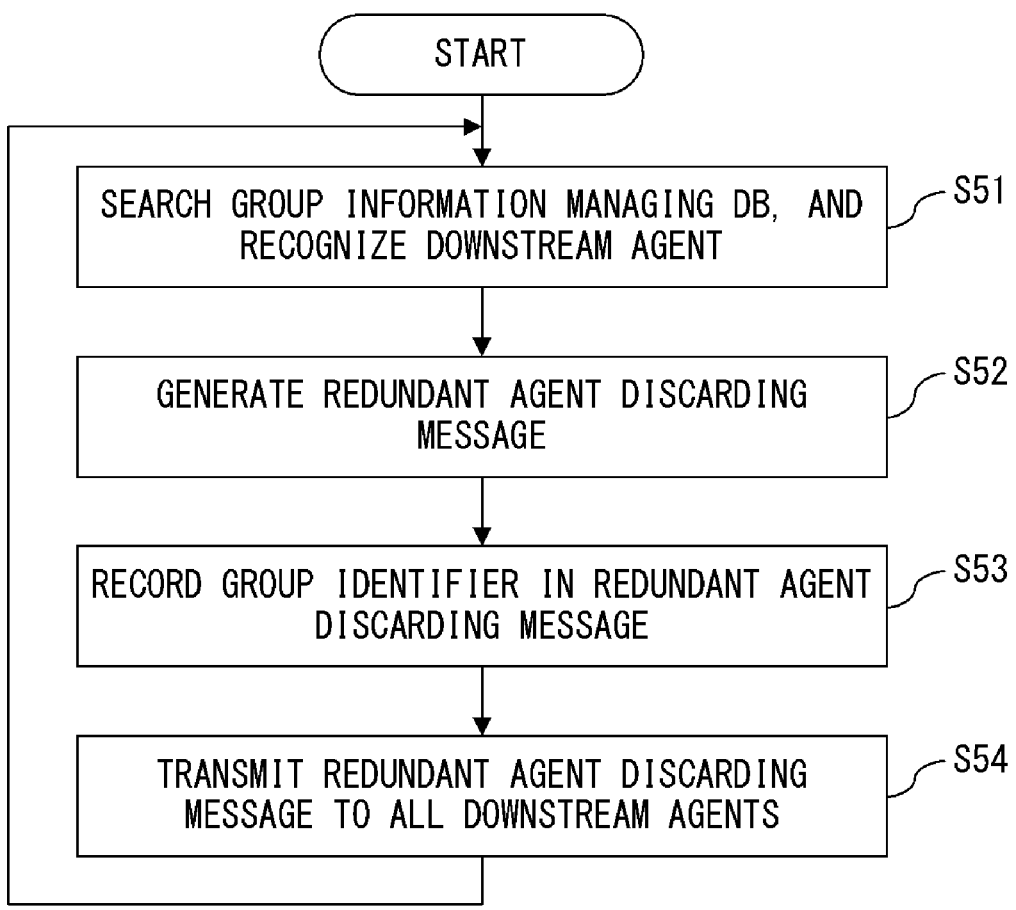
FIG. 15 is a flowchart for a process for implementing a redundant agent discarding process starting unit.

FIG. 15 is a flowchart for a process for implementing the redundant agent discarding process starting unit 32e. The process for implementing the redundant agent discarding process starting unit 32e will be explained in detail by referring to FIG. 15. This process is executed as the processes in steps S14 and S15.

First, in step S51, the group information managing DB 36 is searched in order to obtain the identifier of the downstream adjacent node 30 having the function on the logic tree in which the node 60 has the function "representation". In step S52, a redundant agent discarding message is generated. In step S53, the group identifier corresponding to the logic tree in which the node 60 has the function "representation" is recorded in the redundant agent discarding message. In step S54, the message is transmitted to all the downstream adjacent nodes 30. Thereafter, the process returns to step S51.

The redundant agent discarding message is generated and transmitted only by the measuring node 40, for which l"representation" is set. The transmitted redundant agent discarding message is processed by the redundant agent judgment unit 32f. The redundant agent judgment unit 32f is implemented by the execution of the processes in the flowchart in FIG. 16. By referring to FIG. 16, the process for implementing the adjacent agent finding unit 32f will be explained in detail. This process is executed as the processes in steps S14 and S15 in FIG. 15, being activated by the reception of, for example, a discarding message.

Figure 16:
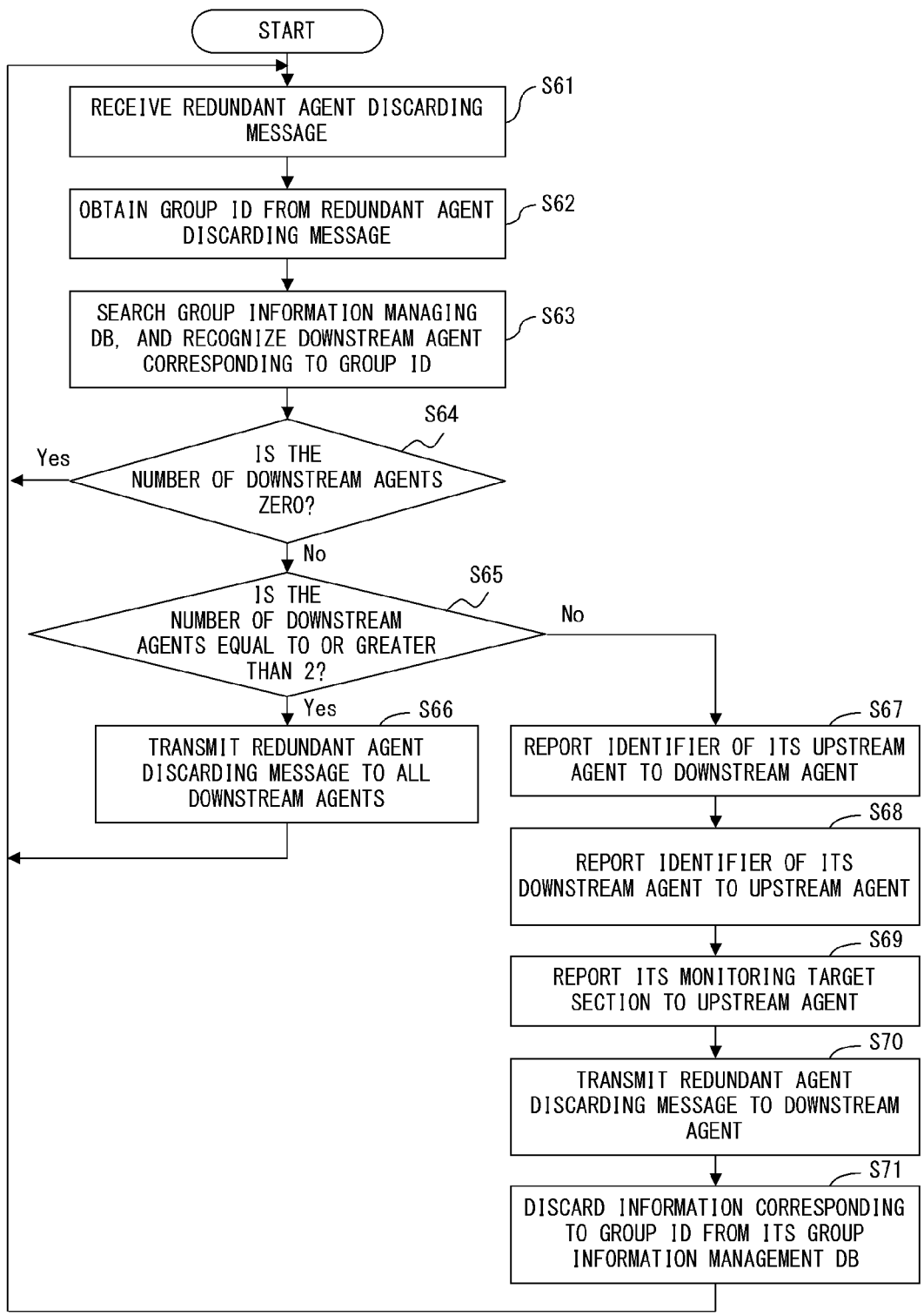
FIG. 16 is a flowchart for a process for implementing a redundant agent decision unit.
Figure 22:
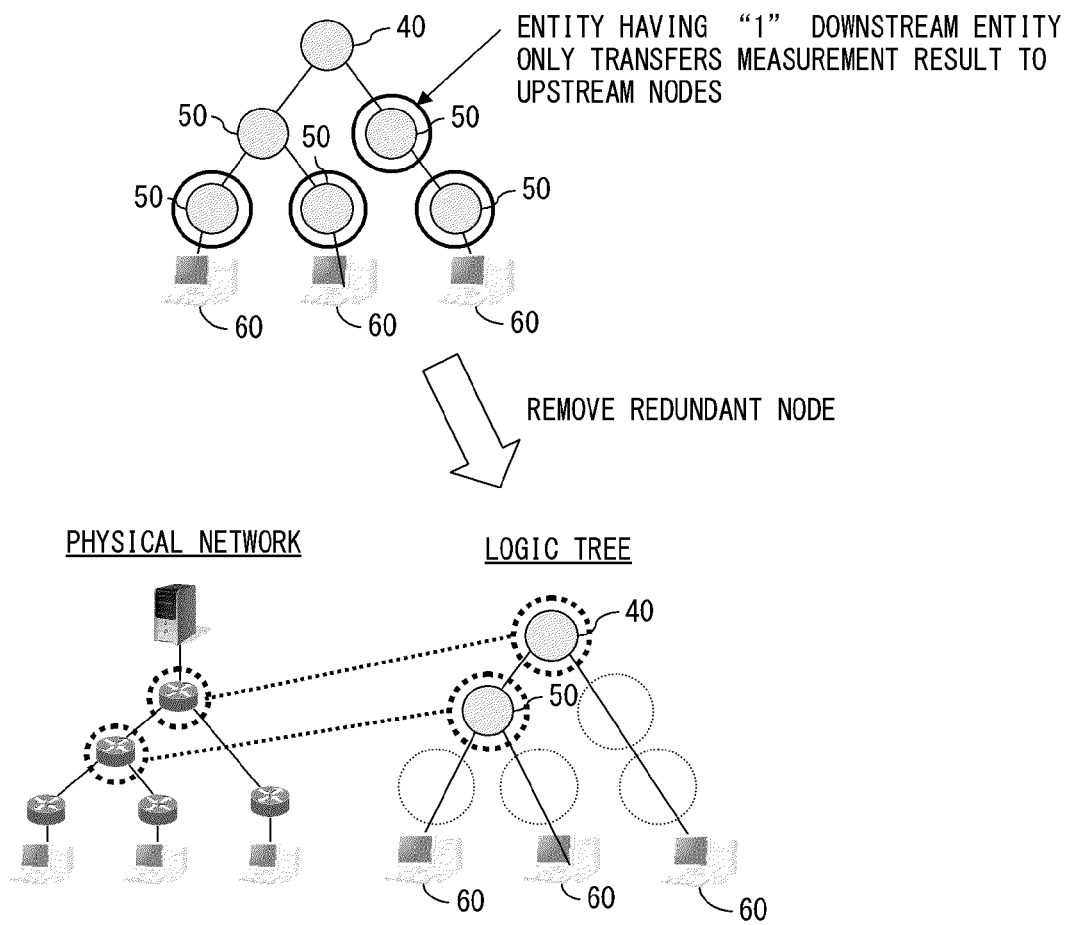
FIG. 22 illustrates redundant nodes to be removed from the logic tree.

Before explaining the flowchart illustrated in FIG. 16, the measuring node 30 to be discarded as a redundant node will be specifically explained by referring to FIG. 22. FIG. 22 illustrates a logic tree including one measuring node 40 having the function of representation, five measuring nodes 50 having the function of relaying, and three measuring nodes 60 having the function of measurement in a state before discarding redundant nodes.

Four measuring nodes 50 in this logic tree will be discarded. Each of the measuring nodes 50 to be discarded has only one adjacent node 30 in the downstream stage. Factually, the measuring node 30 having only one adjacent node 30 in the downstream stage only transfers to the upstream adjacent node the information received from the downstream adjacent node. It does not have to estimate the location of a failure. However, when it is to be used as the measuring node 30, resources are wasted and a load is increased because the measuring node 30 processes the measurement result. This prevents efficient execution of other processes. Further, this causes a long time to be taken for transferring pieces of information. Thus, in the present embodiment, the measuring node 30 having only one adjacent node in the downstream stage is considered a redundant node, and is discarded from the logic tree.

In the process illustrated in FIG. 16, the redundant agent discarding message received from the adjacent node 30 is obtained in step S61. In step S62, the group identifier recorded in the redundant agent discarding message is obtained. In step S63, the group information managing DB 36 is searched, and the adjacent nodes 30 that are closer to the bottom on the logic tree corresponding to the obtained group identifier are recognized. Thereafter, the process proceeds to step S64.

In step S64, it is determined whether or not the number of the recognized adjacent nodes 30 in the downstream is zero. When the function of the node 30 on the logic tree corresponding to the obtained group identifier is "measurement", this means that the node 30 does not exist in the downstream stage, and the determination result is Yes. Thereafter, the process returns to step S61. Otherwise, the determination result is No, and the process proceeds to step S65.

In step S65, it is determined whether or not the number of the recognized adjacent nodes 30 in the downstream is equal to or greater than 2. When the number of the recognized measuring nodes 30 in the downstream is equal to or greater than 2, the determination result is Yes, and the redundant agent discarding message is transmitted to all the measuring nodes 30 in the downstream in step S66. Thereafter, the process proceeds to step S61. Otherwise, the determination result is No, and the process proceeds to step S67.

In steps 67 through S71, the process of discarding the upstream measuring nodes 30 that fulfill the conditions for being a redundant node is executed.

In step S67, information on the adjacent node in the upstream stage of the node 30 is transmitted to the adjacent node 30 in the downstream stage. Thereby, the downstream adjacent node 30 having received this information updates the group information managing DB 36 so that it specifies that the adjacent node specified by the information is the upstream adjacent node 30 of that node 30.

In step S68, information on the adjacent node 30 downstream from the node 30 is transmitted to the adjacent node 30 upstream from that node 30. Thereby, the upstream adjacent node 30 having received the information updates the group information managing DB 36 so that it specifies that the adjacent node specified by the information is the adjacent node 30 downstream from that node 30.

In step S69, information on the monitoring target section of the node 30 is transmitted to the adjacent node 30 upstream from that node 30. The measuring node 30 having received this information adds the monitoring target section specified by the information to the monitoring target section of that node 30, and updates the group information managing DB 36.

In step S70, a redundant agent discarding message is transmitted to the downstream measuring node 30. In step S71, the information corresponding to the group identifier obtained in step S62 is deleted from the group information managing DB 36. Thereafter, the process returns to step S61.

Figure 17:
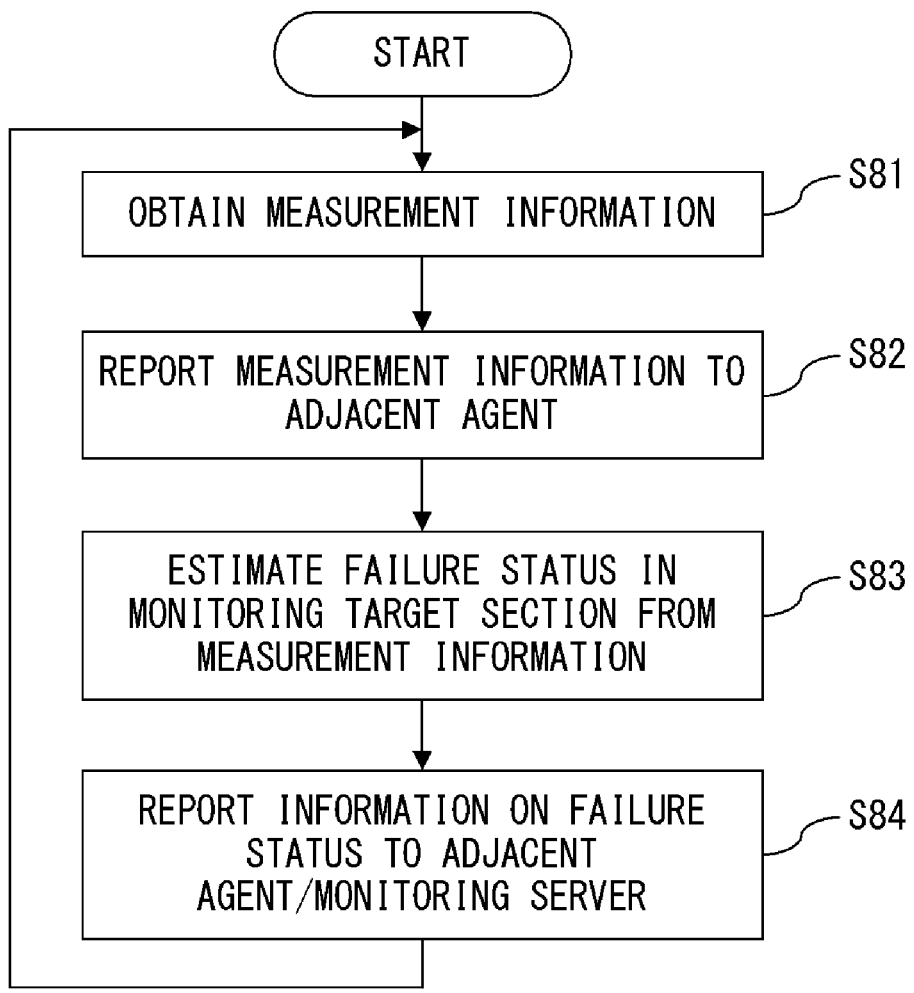
FIG. 17 is a flowchart illustrating in detail the processes executed in steps S5 through S7 in FIG. 10.

FIG. 17 is a flowchart illustrating in detail the processes executed as steps S5 through S7 in FIG. 10. The failure location estimation unit 33 is implemented by the execution of the processes in FIG. 17. Next, the process for implementing the failure location estimation unit 33 will be explained specifically by referring to FIG. 17.

In step S81, the reception quality resulting from measuring the service traffic ("measurement information" in the figure) received from the delivery server 10 at prescribed time points is obtained. In step S82, the obtained measurement result is transmitted to the adjacent node 30 upstream from the node 30 or to the monitoring server 20. Thereafter, the process proceeds to step S83.

Measurement results are transmitted from downstream nodes 30 to the measuring nodes 30 to which the function "measurement" is not assigned. Accordingly, in step S83, the received measurement results are stored in the measurement result storing DB 34, the stored measurement results are analyzed, and the statues of a failure in and out of the monitoring target section are estimated. The estimation result is stored in the analysis result storing DB 35. After storing the result, the estimated status of a failure is reported to the upstream node 30 or the monitoring server 20 in step S84. Thereafter, the process returns to step S81.

Figure 18:
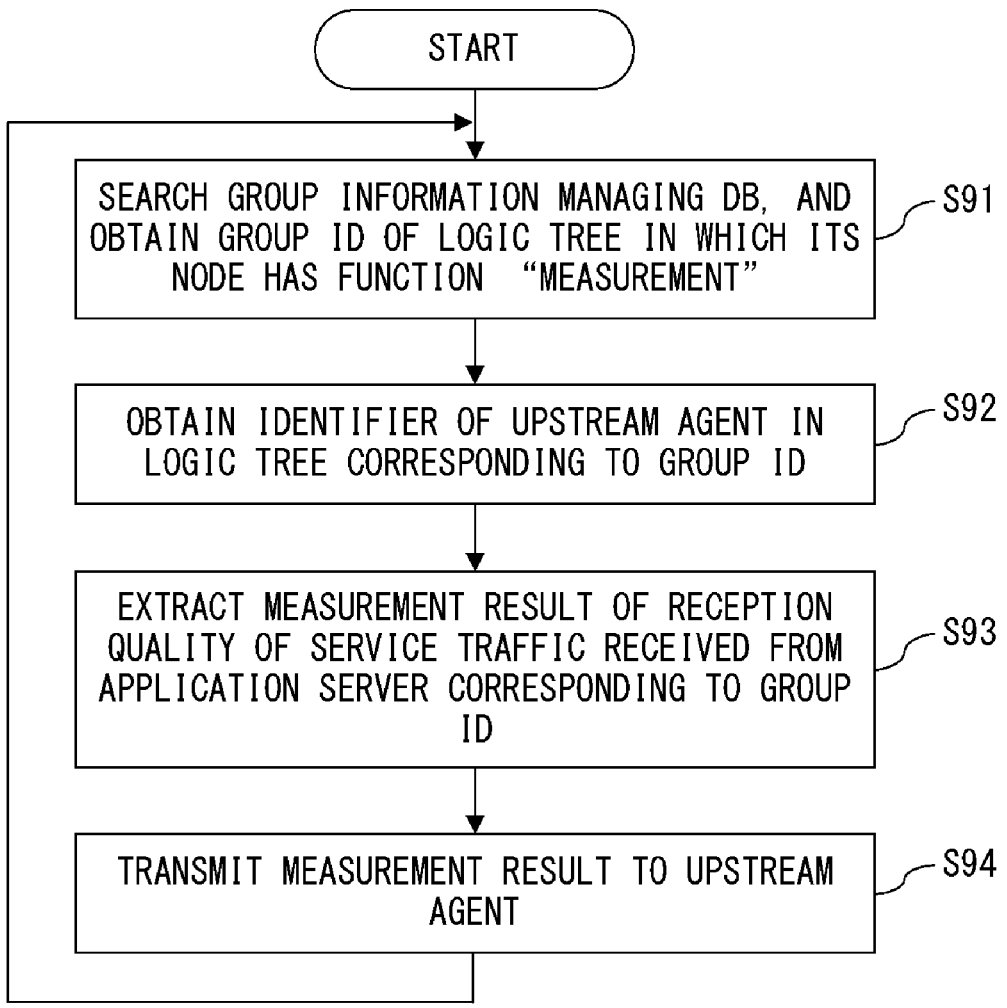
FIG. 18 is a flowchart for a process for implementing a measurement information reporting unit.
Figure 20:
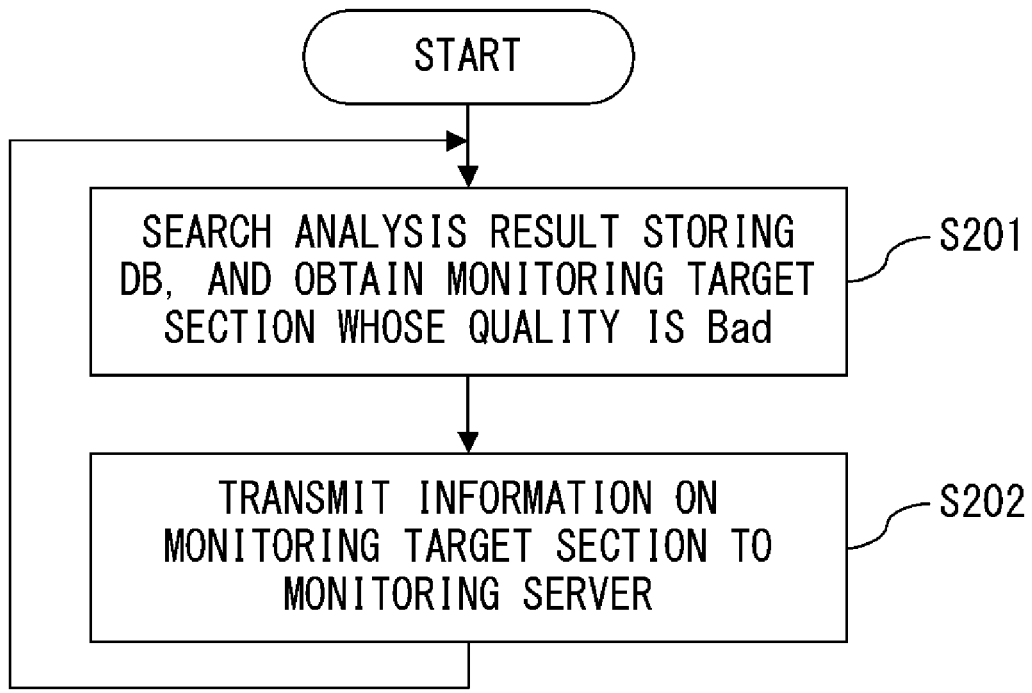
FIG. 20 is a flowchart for a process for implementing a failure location reporting unit.

FIGS. 18 through 20 are flowcharts for the processes for implementing the units 33a through 33c. Next, the processes for implementing the units 33a through 33c will be explained in detail by referring to FIGS. 18 through 20.

FIG. 18 is a flowchart for a process for implementing the measurement information reporting unit 33a. The process for implementing the unit 33a will be explained in detail by referring to FIG. 18. This process is executed in step S82 each time the time specified by the "interval of reporting measurement results" elapses.

In step S91, the group information managing DB 36 is searched, and the group identifier corresponding to the logic tree in which the node 30 has the function of "measurement" is obtained. In step S92, the group information managing DB 36 is searched, and information on the downstream adjacent node 30 on the logic tree corresponding to the group identifier obtained in step S91 is obtained. Step S93 is executed after obtaining that information.

In step S93, the reception quality of the service traffic received from the delivery server 10 corresponding to the group identifier obtained in step S91 is obtained as a measurement result. In step S94, the measurement result is transmitted to the upstream adjacent node 30. Thereafter, the process returns to step S91, and the process in step S91 is executed when the time specified as "interval of reporting measurement results" elapses.

The measuring node 30 having received the thus transmitted measurement result stores it in the measurement result storing DB 34. Upon this storing, the group identifier and the monitoring target section of the measuring node 30 that transmitted the measurement result are also stored as illustrated in FIG. 7.

FIG. 19 is a flowchart for a process for implementing the measurement result analysis unit 33b. The process for implementing the measurement result analysis unit 33b will be explained in detail by referring to FIG. 19. This process is executed in steps S83 and S84 each time the time specified by the "interval of analyzing measurement results" elapses.

In step S101, the group information managing DB 36 is searched, and the group identifier corresponding to the logic tree with the node 30 having the function "representative" or "relaying" is obtained. In step S102, the measurement result storing DB 34 is searched, and the measurement result corresponding to the group identifier obtained in step S101 is obtained. Thereafter, the process proceeds to step S103.

In step S103, the obtained measurement result is analyzed, and it is determined whether or not all the measurement results corresponding to the group identifiers are good. When not all the measurement results are good, the determination result is No, and the process proceeds to step S109. Otherwise, the determination result is Yes, and the process proceeds to step S104.

Here, the method of estimating the statues of a failure in and out of the monitoring target section will be explained specifically by referring to FIG. 23. In FIG. 23, "30-1" denotes the node, and "30-2" and "30-3" denote the nodes downstream from that node 30-1.

The node 30-1 analyzes two types of service traffic to be transferred to the network devices corresponding to the two adjacent nodes 30-2 and 30-3, and estimates the location of a failure. When that analysis indicates good reception quality for both of the adjacent nodes 30-2 and 30-3, the statuses in and out of the monitoring target section are estimated to be good. However, when good reception quality and bad reception quality are both detected, such as in a case when the reception quality on the network device corresponding to the adjacent node 30-3 is bad while the reception quality on the network device corresponding to the adjacent node 30-2 is good, it is estimated that the location of the failure is only on the downstream side. This is because it is highly probable that the service traffic was appropriately transmitted to the network device corresponding to the node 30-1.

When the reception quality is all bad, the location of a failure is estimated to be only on the upstream side. This is because a failure occurring on the upstream side will make all the reception quality bad on the downstream side. Thus, a failure is estimated to have occurred in one of the links between the network devices corresponding to a node 30-1 and the delivery server, and that result is reported to the adjacent node 30.

The adjacent node 30 that has received that estimation result similarly estimates the location of a failure in and out of the monitoring target section on the basis of the reception quality in the monitoring target section. When the adjacent node 30 has received an estimation result from the downstream adjacent node 30 indicating that the location of the failure is in the upstream side, the adjacent node 30 estimates the location of the failure to be in the upstream side on the basis of the fact that the reception quality in the monitoring target section is all bad. In this manner, the estimation result of the location of a failure is reported from one of the nodes 30 to another sequentially in the upward direction, and thereby the location of the failure can be determined or the scope that may include the location of the failure can be narrowed. As a result of this, the location of the failure can easily be determined by the monitoring server 20 even when the measuring node 30 cannot determine the location of the failure. The amount of information required to determine the location is reduced greatly.

FIG. 19 is again explained.

When the determination result in step S103 is Yes, i.e. when the reception quality in all the monitoring target sections is good, the reception quality in all the monitoring target sections is estimated to be good in step S104. In step S105, the reception quality out of the monitoring target section is estimated to be good. In step S106, the quality, i.e. the estimation result of a failure for each of the monitoring target sections is stored in the analysis result storing DB 35. The statuses of failures in and out of the monitoring target sections are thus estimated, and the estimation results are stored. Thereafter, the process proceeds to step S107.

In step S107, the group information managing DB 36 is searched, and whether or not there is a group identifier whose node 30 is assigned the function "relaying" is determined.

When there is such an identifier, the determination result is Yes, and the process proceeds to step S108. In step S108, a measurement result of a portion out of the monitoring target section is generated as reception quality, the result is transmitted to the upstream adjacent node 30, and the process returns to step S101. When there is not such an identifier, the process returns to step S101. The process in step S101 is executed when the time specified by the "interval of analyzing measurement results" has elapsed.

In step S109, which is executed with the determination result in step S103 being No, it is determined whether or not all the obtained measurement results are bad. When not all the measurement results are bad, i.e. when both good reception quality and bad reception quality are detected, the determination result is No, and the process proceeds to step S112. Otherwise, the determination result is Yes, and the process proceeds to step S110.

In step S110, the quality in all the monitoring target sections is estimated to be good. In step S111, the quality in a portion out of the monitoring target sections is estimated to be bad. The statuses of failures in and out of the monitoring target sections are thus estimated, and thereafter the process proceeds to step S106.

In step S112, the quality in the monitoring target section including the downstream adjacent node 30 (that corresponds to the adjacent node 30-3 in FIG. 23) is estimated to be bad. After estimating the statuses of failures in and out of the monitoring target sections, the process proceeds to step S106.

The process proceeds to step S112 when a failure occurs on the link with the downstream adjacent node 30. In such a case, the downstream adjacent node 30 measures the service traffic, and a measurement result of "bad" is transmitted. The node 30 measures the service traffic that it has received, and obtains a measurement result of "good". On the basis of this procedure, the node 30 estimates that a failure has occurred in the monitoring target section, which is the link with the downstream adjacent node.

FIG. 20 is a flowchart for a process for implementing the failure location reporting unit 33c. The process for implementing the failure location reporting unit 33c will be explained in detail by referring to FIG. 20. This process is executed in step S84 in FIG. 17 each time the time specified by "interval of reporting analysis results" elapses.

In step S201, the analysis result storing DB 35 is searched, and obtains information on a monitoring target section whose reception quality is "bad", i.e., information on the estimated location (link) of a failure. In step S202, the obtained information on the monitoring target section is transmitted to the monitoring server 20. Thereafter, the process returns to step S201. The execution of step S201 waits for the time specified by "interval of reporting analysis results" to elapse.

The analysis result storing DB 35 managed by each of the measuring nodes 30 stores the analysis results on which the results of the analysis by the adjacent node 30 downstream from that node 30 are reflected. Accordingly, when the reception quality in a monitoring target section is "bad", that monitoring target section can be expected to involve a failure or to have a probability of involving a failure. Reporting only a monitoring target section in this status to the monitoring server 20 makes it possible to locate with a high accuracy, by using only a small amount of information, a monitoring target section (link) in which a failure has occurred. The monitoring server 20 stores the received information on the monitoring target section in a failure estimated location DB 23.

Hereinafter, the monitoring server 20 will be explained specifically by referring to FIGS. 24 through 28.

Figure 24:
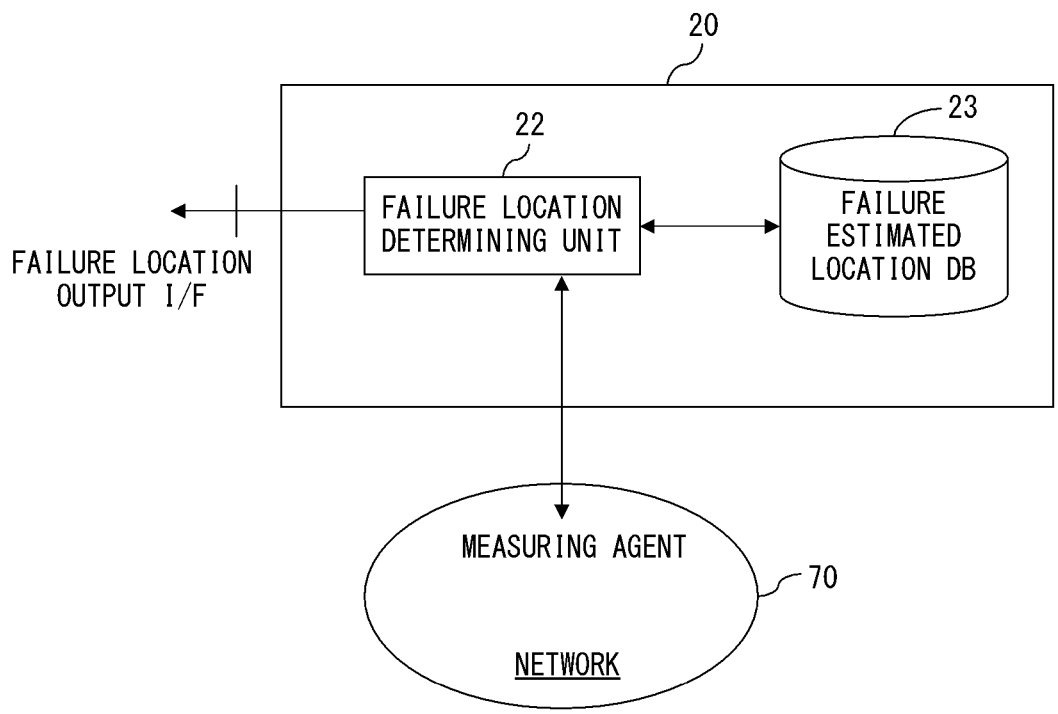
FIG. 24 illustrates the functional configuration of a monitoring server.

FIG. 24 illustrates the functional configuration of the monitoring server 20. The function illustrated in FIG. 24 is implemented similarly to the measuring node 30, i.e., by executing a program (referred to as a "monitoring program" hereinafter for convenience). The monitoring program implements a failure location determining unit 22 in the monitoring server 20, and generates and manages the failure estimated location DB 23.

Similarly to the measuring node 30, the monitoring server 20 can be implemented by the computer illustrated in FIG. 29. In the configuration illustrated in FIG. 29, the monitoring program is stored in the external storage device 85 or in the storage medium MD, or is received from an external device through the network 70 by using the network connection device 87. The failure estimated location DB 23 is constructed in, for example, the external storage device 85.

Figure 28:
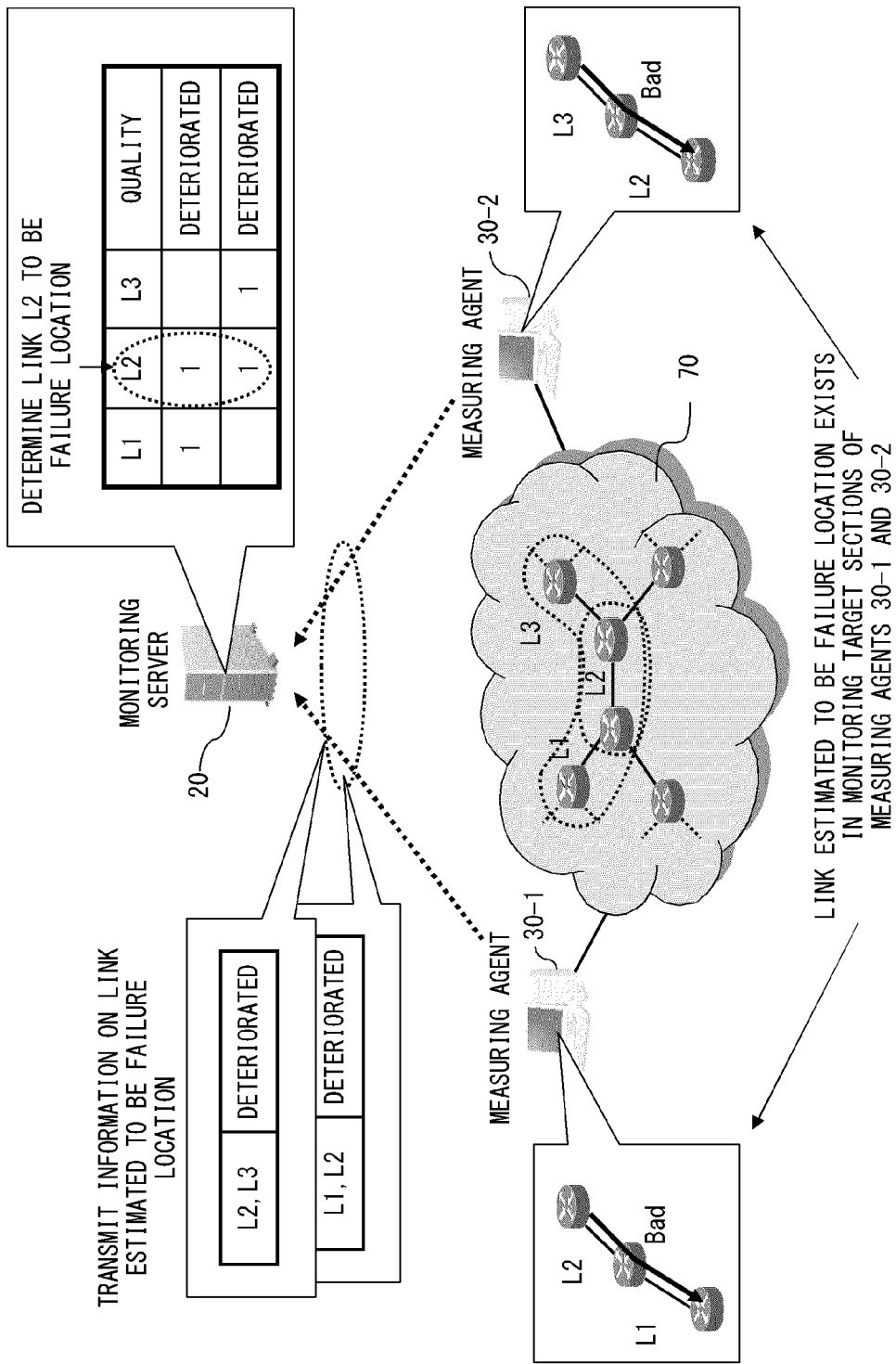
FIG. 28 illustrates a method of determining the location of a failure performed by the monitoring server.

In the failure estimated location DB 23, the information indicating the locations of failures estimated by the measuring nodes 30 is stored by the failure location determining unit 22 as mentioned above. In the failure estimated location DB 23, as illustrated in FIG. 25, the information indicating the location of a failure estimated for each of the group identifiers is stored. In FIG. 25, the locations of failures are illustrated in the form of IP addressees. Thereby, this DB, similarly to the table illustrated in FIG. 1, describes the locations (links) on which the reception quality on each of the transmission paths is "bad". In FIG. 28, which will be explained later, the value "1" is used to express "bad" reception quality.

The monitoring program that implements the failure location determining unit 22 makes the monitoring server 20 execute the processes described below. Hereinafter, the processes implemented by the monitoring program will be explained in detail by referring to the flowcharts illustrated in FIGS. 26 and 27.

Figure 26:
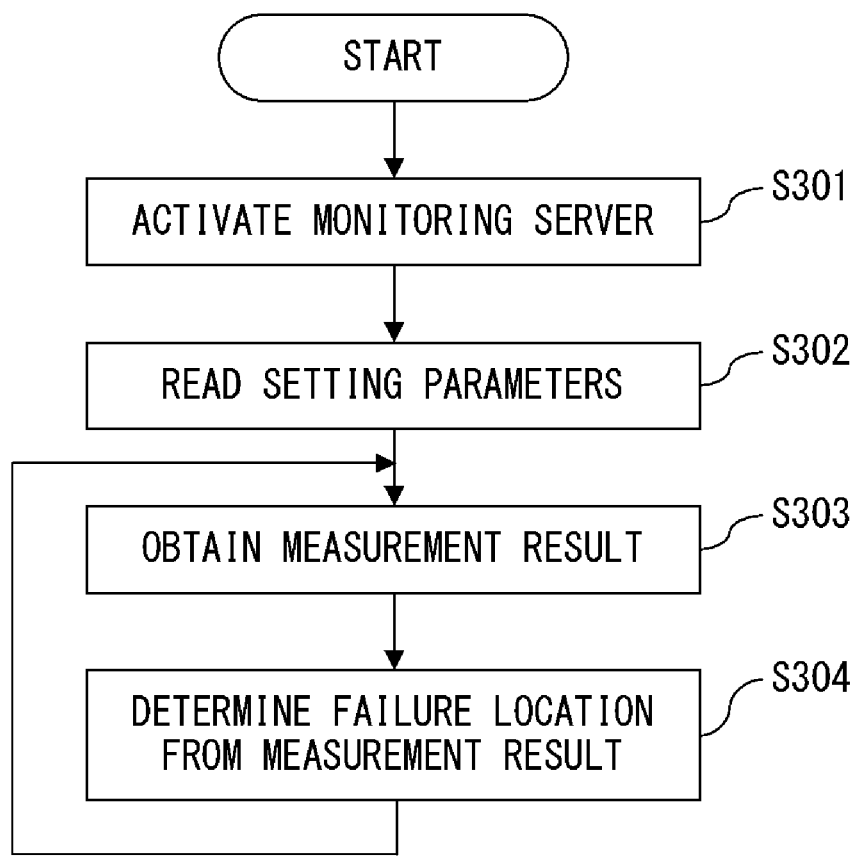
FIG. 26 is a flowchart illustrating the overall process executed by a monitoring program in a monitoring server.

FIG. 26 is a flowchart illustrating the overall process executed by the monitoring program. First, the flow of the overall process will be explained by referring to FIG. 26.

The monitoring program is started in response to an activation request from a person who manages the system (step S301). After the program is started, setting parameters such as "interval of determining measurement results", etc., are read in accordance with, for example, an instruction from the managing person (step S302). The "interval of locating" is a time interval at which locations of failures are determined, and if the value set as the time interval is 10 seconds, the location of a failure is performed every 10 seconds.

After the setting parameters are read, the information on the section (link) estimated by the measuring node 30 to be the location of a failure is received on an as-necessary basis, and the received information is stored in the failure estimated location DB 23 (step S303). The response to that information is made according to the "interval of determining measurement results", and the process proceeds to step S304. In step S304, the information (measurement result) on the section estimated to be the location of a failure is read out from the failure estimated location DB 23, and the read information is analyzed in order to determine the location of the failure. The result of the locating is output to the external environment via, for example, a failure location output I/F provided in the monitoring server 20. A manner of that outputting may be writing the information onto a database provided for storing analysis results, providing the information to an external process using a socket communication technique, publicizing the information on the Web, and etc. After such outputting, the process returns to step S303. In this manner, the location of a failure is determined according to the "interval of determining measurement results".

Figure 27:
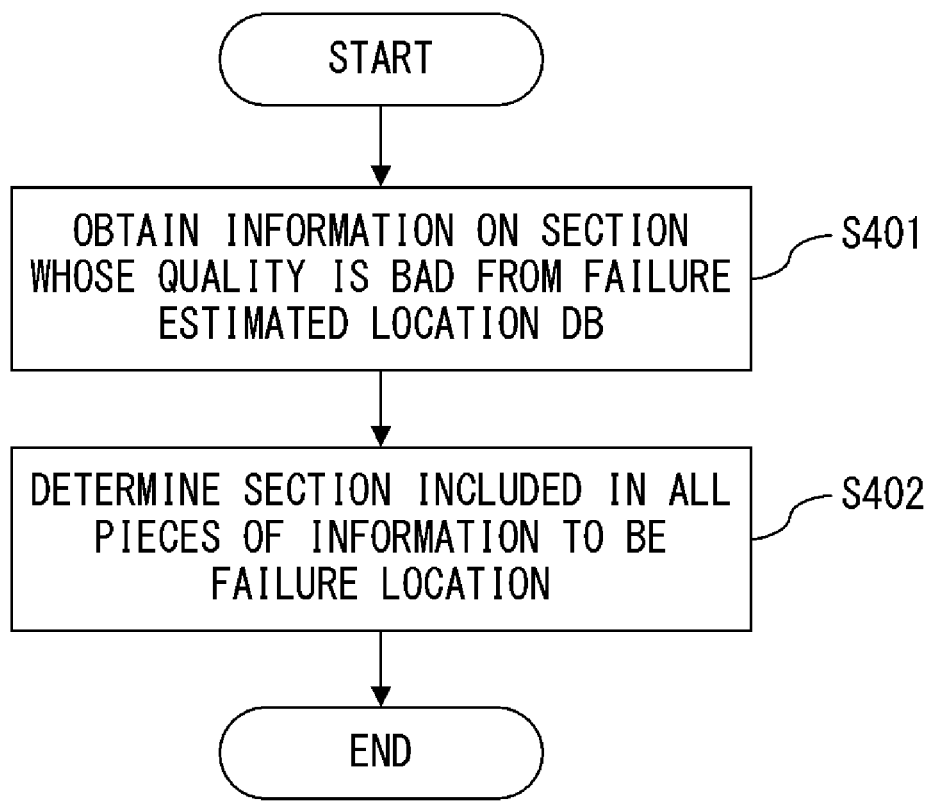
FIG. 27 is a flowchart for a process for implementing a failure location determining unit.

FIG. 27 is a flowchart for a process for implementing the failure location determining unit 22. The process for implementing the failure location determining unit 22 will be explained by referring to FIG. 27. This process is one of the processes executed in step S304.

In step S401, all the information is read out from the failure estimated location DB 23. In step S402, the read information is analyzed, and a section covered by a plurality of group identifiers is extracted as illustrated in FIG. 28, and the extracted section is determined to be the location of a failure. Thereafter, the processes in FIG. 27 are terminated. After the processes are terminated, the result of determining the location of the failure is output.

As described above, the nodes in the system illustrated in FIG. 2 autonomously construct a logic tree structure corresponding to the transmission path of service traffic, automatically set a monitoring target link included in the transmission path in which the occurrence of a failure is to be monitored, monitor the set monitoring target, and estimate to be the location of a failure a monitoring target link in which there is a probability of the occurrence of a failure. Such an estimation can narrow the scope (links) that have to be considered for locating a failure occurring somewhere on the transmission path to a very small scope. However, determining the location of a failure requires information from the entire transmission path of the service traffic being transmitted from the delivery server. Accordingly, the present invention enables analysis covering a wide area on a network, although that area is not as wide as the one enabled by the conventional centralized system. As a result of this, the accuracy in determining the location of a failure can be maintained at a high level while the amount of information to be analyzed by the monitoring server is reduced. Thereby, the software resources that the monitoring server has to be provided with are reduced, and therefore a load on the server are also reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment of the present invention have been described in detail, it should be understood that the various changes, substitutions, and alterations could be made hereto without departing from the spirit and scope of the invention.

The invention claimed is:

1. A non-transitory storage medium storing a network failure detection program for causing a computer to execute procedures, the computer being used as a node that is on a transmission path through which a service transmitted from a delivery server on a network is transmitted and that monitors traffic of the service transmitted from the delivery server, the procedures comprising:
specifying, by using the identifier capable of identifying the delivery server, a upstream node that is located upstream from the node on the transmission path and that has an identifier, and registering the upstream node in a group information managing database;
transmitting a link construction message to the upstream node;
registering a downstream node in the group information managing database when the link construction message is received from the downstream node that is located downstream from the node on the transmission path;
detecting a quality of traffic of the service delivered to the node when the node is a most downstream node on the transmission path which does not have the downstream node registered in the group information managing database, and transmitting the quality of the traffic to the upstream node;
determining whether or not a failure has occurred in the traffic of the service for the downstream node on the basis of the quality of the traffic received from the downstream node; and
reporting a failure location, the reporting including
when all of the qualities of the traffic received from the downstream node are bad, reporting to the upstream node or a monitoring server that a failure has occurred upstream, and
when both a good quality and a bad quality are detected in the qualities of the traffic received from the downstream node, reporting to the upstream node or the monitoring server which downstream node is transmitting the bad quality.

2. The non-transitory storage medium according to claim 1, further comprising:
discarding a redundant agent when only one downstream node is registered in the group information managing database, the discarding including,
reporting information relating to the upstream node to the downstream node,
reporting information relating to the downstream node to the upstream node, and
transmitting a redundant agent discarding message to the downstream node;
discarding from the group information managing database the upstream node which has transmitted the redundant agent discarding message when the redundant agent discarding message is received from the upstream node;
registering a node indicated by the information relating to the upstream node in the group information managing database as an upstream node when the information relating to the upstream node is received; and
registering a node indicated by the information relating to the downstream node in the group information managing database as a downstream node when the information relating to the downstream node is received.

3. A network failure detection system for detecting a failure occurring on a transmission path through which a service transmitted from a delivery server on a network is transmitted, the network failure detection system comprising:
a message transmission unit to specify, by using the identifier capable of identifying the delivery server, a upstream node that is located upstream from the node on the transmission path and that has an identifier, to register the upstream node in a group information managing database, and to transmit a link construction message to the upstream node;
an adjacent agent determination unit to register a downstream node in the group information managing database when the link construction message is received from the downstream node that is located downstream from the node on the transmission path;
a measurement information reporting unit to detect a quality of traffic of the service delivered to the node when the node is a most downstream node on the transmission path which does not have the downstream node registered in the group information managing database, and to transmit the quality of the traffic to the upstream node;
a measurement result analysis unit to determine whether or not a failure has occurred in the traffic of the service for the downstream node on the basis of the quality of the traffic received from the downstream node; and a failure location reporting unit to report a failure location, wherein when all of the qualities of the traffic received from the downstream node are bad, the failure location reporting unit reports to the upstream node or a monitoring server that a failure has occurred upstream, and when both a good quality and a bad quality are detected in the qualities of the traffic received from the downstream node, the failure location reporting unit reports to the upstream node or the monitoring server which downstream node is transmitting the bad quality.

4. A network failure detection method performed by a network failure detection system for detecting a failure occurring on a transmission path through which a service transmitted from a delivery server on a network is transmitted, the method comprising:

specifying, by using the identifier capable of identifying the delivery server, a upstream node that is located upstream from the node on the transmission path and that has an identifier, and registering the upstream node in a group information managing database;

transmitting a link construction message to the upstream node;

registering a downstream node in the group information managing database when the link construction message is received from the downstream node that is located downstream from the node on the transmission path;

detecting a quality of traffic of the service delivered to the node when the node is a most downstream node on the transmission path which does not have the downstream node registered in the group information managing database, and transmitting the quality of the traffic to the upstream node;

determining whether or not a failure has occurred in the traffic of the service for the downstream node on the basis of the quality of the traffic received from the downstream node; and reporting a failure location, the reporting including when all of the qualities of the traffic received from the downstream node are bad, reporting to the upstream node or a monitoring server that a failure has occurred upstream, and when both a good quality and a bad quality are detected in the qualities of the traffic received from the downstream node, reporting to the upstream node or the monitoring server which downstream node is transmitting the bad quality.

* * * * *